US012720344B2

(12) United States Patent
Jiang et al.

(10) Patent No.: US 12,720,344 B2
(45) Date of Patent: Aug. 25, 2026

(54) MEASUREMENT METHOD AND APPARATUS

(71) Applicant: 1FINITY Inc., Kawasaki (JP)

(72) Inventors: Qinyan Jiang, Beijing (CN); Xin Wang, Beijing (CN); Meiyi Jia, Beijing (CN)

(73) Assignee: 1FINITY Inc., Kawasaki (JP)

( * ) Notice: Subject to any disclaimer, the term of this patent is extended or adjusted under 35 U.S.C. 154(b) by 343 days.

(21) Appl. No.: 18/371,571

(22) Filed: Sep. 22, 2023

(65) Prior Publication Data

US 2024/0022933 A1 Jan. 18, 2024

Related U.S. Application Data

(63) Continuation of application No. PCT/CN2021/085152, filed on Apr. 1, 2021.

(51) Int. Cl.
*H04W 24/08* (2009.01)
*H04W 48/08* (2009.01)

(52) U.S. Cl.
CPC ........... *H04W 24/08* (2013.01); *H04W 48/08* (2013.01)

(58) Field of Classification Search
CPC ....... H04W 4/18; H04W 24/08; H04W 24/04; H04W 24/02; H04W 48/17; H04W 48/18; H04W 48/08
See application file for complete search history.

(56) References Cited

U.S. PATENT DOCUMENTS

2015/0139183 A1 5/2015 Pradas et al.
2020/0029238 A1 1/2020 Si et al.
2020/0221404 A1* 7/2020 Takeda .................. H04W 72/23
2020/0236636 A1 7/2020 Liu et al.
(Continued)

FOREIGN PATENT DOCUMENTS

BR 112021013776 A2 * 9/2021 ............ H04W 72/23
CN 109474939 A 3/2019
(Continued)

OTHER PUBLICATIONS

International Search Report and Written Opinions of the International Searching Authority issued by the China National Intellectual Property Administration for corresponding Chinese Patent Application No. PCT/CN2021/085152, mailed on Dec. 31, 2021, with an English translation.
(Continued)

*Primary Examiner* — Mong-Thuy T Tran
(74) *Attorney, Agent, or Firm* — Myers Wolin, LLC

(57) ABSTRACT

A measurement apparatus includes a receiver configured to receive configuration information for cell reselection or measurement in connected state transmitted by a network device, the configuration information comprising first indication information indicating one or more synchronization signal blocks to be measured, wherein one or more bits of the first indication information is/are set according to second indication information indicating a frequency-specific quasi-co-location relationship between synchronization signal blocks, and a processor configured to perform measurement according to the synchronization signal blocks to be measured indicated by the first indication information.

15 Claims, 12 Drawing Sheets

Terminal equipment

Network device 801. receiving by the terminal equipment configuration information transmitted by the network device 802. Performing measurement according to the SSBs to be measured as indicated

(56) References Cited

U.S. PATENT DOCUMENTS

| | | | | |
|---|---|---|---|---|
| 2021/0136591 | A1* | 5/2021 | Si | H04W 52/146 |
| 2021/0297886 | A1 | 9/2021 | Chen et al. | |
| 2021/0297968 | A1* | 9/2021 | Alriksson | H04W 72/30 |
| 2021/0314854 | A1* | 10/2021 | Cui | H04W 48/16 |
| 2021/0377883 | A1* | 12/2021 | Jung | H04W 56/00 |
| 2021/0385037 | A1* | 12/2021 | Yoon | H04L 5/0048 |
| 2022/0022072 | A1* | 1/2022 | Jiang | H04W 24/10 |
| 2022/0104153 | A1* | 3/2022 | Ko | H04W 56/00 |
| 2022/0159479 | A1 | 5/2022 | Si et al. | |
| 2022/0256489 | A1* | 8/2022 | Tian | H04W 56/001 |
| 2022/0279427 | A1* | 9/2022 | Hwang | H04W 48/16 |
| 2022/0417990 | A1* | 12/2022 | Chen | H04L 5/0098 |

FOREIGN PATENT DOCUMENTS

| | | | | | |
|---|---|---|---|---|---|
| CN | 111278023 | A | | 6/2020 | |
| CN | 111835482 | A | * | 10/2020 | H04L 5/0094 |
| CN | 111918392 | A | | 11/2020 | |
| EP | 3 681 192 | A1 | | 7/2020 | |
| EP | 4037391 | B1 | * | 11/2023 | H04W 24/02 |
| ES | 2967403 | T3 | * | 4/2024 | H04W 24/02 |
| WO | 2020/063808 | A1 | | 4/2020 | |
| WO | WO-2021087779 | A1 | * | 5/2021 | H04W 56/001 |

OTHER PUBLICATIONS

3GPP TS 38.213 V16.5.0, "3rd Generation Partnership Project; Technical Specification Group Radio Access Network; NR; Physical layer procedures for control (Release 16)" Mar. 2021.

3GPP TS 38.214 V16.5.0, "3rd Generation Partnership Project; Technical Specification Group Radio Access Network; NR; Physical layer procedures for data (Release 16)" Mar. 2021.

Notice of Reasons for Refusal issued by the Japan Patent Office for corresponding Japanese Patent Application No. 2023-559134, mailed on Sep. 17, 2024, with an English translation.

3GPP TS 38.331 V16.4.1, "3rd Generation Partnership Project; Technical Specification Group Radio Access Network; NR; Radio Resource Control (RRC) protocol specification (Release 16)" Mar. 2021.

The Extended European search report with the Supplementary European search report and the European search opinion, issued by the European Patent Office for corresponding European Patent Application No. 21934051.0, mailed on Apr. 24, 2024.

Fujitsu, "Enhancements to initial access procedure for NR-U", Agenda Item: 7.2.2.2.2, 3GPP TSG-RAN WG1 #98bis, R1-1910132, Chongqing, China, Oct. 14-20, 2019.

Nokia et al., "Remaining aspects of Measurements requirements in NR-U", Agenda Item: 7.1.5.10, 3GPP TSG-RAN WG4 Meeting #96-e, R4-2010592, E-meeting, Aug. 17-28, 2020.

The First Examination Report issued by the Indian Patent Office for corresponding Indian Patent Application No. 202337060882, mailed on Nov. 29, 2024, with an English translation.

Ericsson, "RRM in NR-U", Agenda Item: 6.2.3.2, 3GPP TSG-RAN WG2 #108, R2-1914648, Revision of R2-1912646, Reno, USA, Nov. 18-22, 2019.

Notice of Preliminary Rejection issued by the Korean Intellectual Property Office for corresponding Korean Patent Application No. 10-2023-7033548 mailed on Oct. 27, 2025, with an English translation.

* cited by examiner

MEASUREMENT METHOD AND APPARATUS

CROSS REFERENCE TO RELATED APPLICATION

This application is a continuation application of International Application PCT/CN2021/085152 filed on Apr. 1, 2021, and designated the U.S., the entire contents of which are incorporated herein by reference.

TECHNICAL FIELD

The embodiments of the present disclosure relate to the communication technology field.

BACKGROUND

Currently, a New Radio (NR) system can operate at frequency bands (including FR1 and FR2) in the following two frequency ranges, but is not yet supported to operate in higher frequency bands.

| Frequency range designation | Corresponding frequency range |
|---|---|
| FR1 | 410 MHz-7125 MHz |
| FR2 | 24250 MHz-52600 MHz |

Such that 3GPP in standardization work of Rel-17 will study how to support the operation of the NR in higher frequency bands (e.g., frequency bands in a frequency range from 52.6 to 71 GHz). The above higher frequency band range includes unlicensed (or shared) bands.

In an unlicensed (or shared) frequency band, a transmitting device may need to perform channel sensing before transmission, and can transmit only when a channel is detected to be idle, such mechanism e.g. is called Listen Before Talk (LBT). On the one hand, this is to protect ongoing transmission of other device and avoid causing interference; on the other hand, it is also to ensure that a receiving device is not interfered with and can receive correctly.

On the other hand, in the NR system, a terminal equipment may perform measurement based on a Synchronization Signal Block (SSB, or SS/PBCH Block), including measurement of Radio Resource Management (RRM)/measurement of Radio Link Management (RLM)/measurement of Channel State Information (CSI) feedback, etc.

In order to support measurement by the terminal equipment based on the SSB, a network device (such as a base station) will transmit the SSB and may transmit configuration information (or called measurement configuration) for SSB-based measurement to the terminal equipment. For example, the base station may indicate a time-frequency location of the SSB by using the configuration information.

It should be noted that the above introduction to the technical background is just to facilitate a clear and complete description of the technical solutions of the present disclosure, and is elaborated to facilitate the understanding of persons skilled in the art. It cannot be considered that the above technical solutions are known by persons skilled in the art just because these solutions are elaborated in the Background of the present disclosure.

SUMMARY

However, the inventors find: for cell reselection or measurement in connected state, for a SSB at a certain frequency location, a network device (such as a base station) may transmit information for indicating a SSB to be measured in a SSB Measurement Timing Configuration (SMTC) measurement duration via a system message or dedicated Radio Resource Control (RRC) signaling. However, according to current methods, for unlicensed frequency bands, in some cases, a network device (a base station) may not be able to indicate a SSB to be measured in the SMTC measurement duration, and it may further greatly reduce the flexibility of a network device configuration and increase complexity and power consumption of terminal equipment measurement.

In addition, for idle state and/or inactive state measurement, for a SSB at a certain frequency location, the network device may transmit information for indicating a SSB to be measured in the SMTC measurement duration via a system message or dedicated RRC signaling. However, according to current methods, for unlicensed frequency bands, in some cases, when a network device transmits information for indicating a SSB to be measured in the SMTC measurement duration, a terminal equipment may not be able to determine the SSB to be measured according to the information, which may cause the terminal equipment to be unable to perform corresponding measurement.

For at least one of the above problems, the embodiments of the present disclosure provide a measurement method and apparatus.

According to one aspect of the embodiments of the present disclosure, a measurement method is provided, including:

receiving, by a terminal equipment, configuration information for cell reselection or measurement in connected state transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks; and performing, by the terminal equipment, measurement according to the synchronization signal blocks to be measured indicated by the first indication information.

According to another aspect of the embodiments of the present disclosure, a measurement apparatus is provided, including:

a receiving unit configured to receive configuration information for cell reselection or measurement in connected state transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks; and a measuring unit configured to perform measurement according to the synchronization signal blocks to be measured indicated by the first indication information.

According to another aspect of the embodiments of the present disclosure, a measurement method is provided, including:

receiving, by a terminal equipment, configuration information for an idle state or inactive state transmitted by a network device, the configuration information including first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks; and performing, by the terminal equipment, measurement according to the synchronization signal blocks to be measured indicated by the first indication information.

According to another aspect of the embodiments of the present disclosure, a measurement apparatus is provided, including:

a receiving unit configured to receive configuration information for an idle state or inactive state transmitted by a network device, the configuration information including first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks; and a measuring unit configured to perform measurement according to the synchronization signal blocks to be measured indicated by the first indication information.

According to another aspect of the embodiments of the present disclosure, a measurement method is provided, including:

receiving, by a terminal equipment, configuration information for an idle state or inactive state transmitted by a network device, wherein in a case where the configuration information is for an unlicensed frequency band, the configuration information does not include first indication information indicating one or more synchronization signal blocks to be measured.

According to another aspect of the embodiments of the present disclosure, a measurement apparatus is provided, including:

a receiving unit configured to receive configuration information for an idle state or inactive state transmitted by a network device, wherein in a case where the configuration information is for an unlicensed frequency band, the configuration information does not include first indication information indicating one or more synchronization signal blocks to be measured.

One of the advantageous effects of the embodiments of the present disclosure is: for certain measurements (such as cell reselection measurement and connected state RRM measurement) in unlicensed (or shared) frequency bands, a terminal equipment can correctly understand measurement information. In addition, the terminal equipment can perform certain measurements (such as idle state or inactive state measurement) for unlicensed (or shared) frequency bands. Thereby, the flexibility of a network device configuration is improved, and the complexity and power consumption of terminal equipment measurement are further reduced.

Referring to the later description and figures, specific implementations of the present disclosure are disclosed in detail, indicating a manner that the principle of the present disclosure can be adopted. It should be understood that the implementations of the present disclosure are not limited in terms of the scope. Within the scope of the terms of the appended claims, the implementations of the present disclosure include many changes, modifications and equivalents.

Features that are described and/or shown with respect to one implementation can be used in the same way or in a similar way in one or more other implementations, can be combined with or replace features in the other implementations.

It should be emphasized that the term "comprise/include" when being used herein refers to the presence of a feature, a whole piece, a step or a component, but does not exclude the presence or addition of one or more other features, whole pieces, steps or components.

DESCRIPTION OF DRAWINGS

An element and a feature described in a figure or an implementation of the present embodiments of the present disclosure can be combined with an element and a feature shown in one or more other figures or implementations. In addition, in the figures, similar numerals represent corresponding components in several figures, and can be used to indicate corresponding components used in more than one implementations.

DETAILED DESCRIPTION

Figure 1:
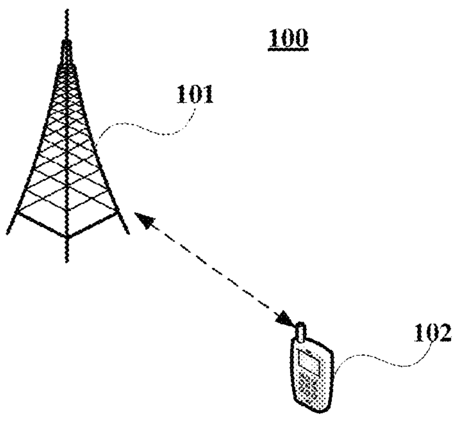
FIG. 1 is a schematic diagram of a communication system in the embodiments of the present disclosure.

Referring to the figures, through the following Specification, the above and other features of the present disclosure will become obvious. The Specification and the figures specifically disclose particular implementations of the present disclosure, showing partial implementations which can adopt the principle of the present disclosure. It should be understood that the present disclosure is not limited to the described implementations, on the contrary, the present disclosure includes all the modifications, variations and equivalents falling within the scope of the attached claims.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to", the term "based on" should be understood as "at least partially based on", unless the context clearly indicates otherwise.

In the embodiments of the present disclosure, the term "a communication network" or "a wireless communication network" may refer to a network that meets any of the following communication standards, such as Long Term Evolution (LTE), LTE-Advanced (LTE-A), Wideband Code Division Multiple Access (WCDMA), High-Speed Packet Access (HSPA) and so on.

And, communication between devices in a communication system can be carried out according to a communication protocol at any stage, for example may include but be not limited to the following communication protocols: 1G (generation), 2G, 2.5G, 2.75G, 3G, 4G, 4.5G, 5G, New Radio (NR) and so on, and/or other communication protocols that are currently known or will be developed in the future.

In the embodiments of the present disclosure, the term "a network device" refers to, for example, a device that connects a terminal equipment in a communication system to a communication network and provides services to the terminal equipment. The network device may include but be not limited to the following devices: Base Station (BS), Access Point (AP), Transmission Reception Point (TRP), a broadcast transmitter, Mobile Management Entity (MME), a gateway, a server, Radio Network Controller (RNC), Base Station Controller (BSC) and so on.

The base station may include but be not limited to: node B (NodeB or NB), evolution node B (eNodeB or eNB) and a 5G base station (gNB), etc., and may further includes Remote Radio Head (RRH), Remote Radio Unit (RRU), a relay or a low power node (such as femeto, pico, etc.), Integrated Access and Backhaul (IAB) node or IAB-DU or IAB-donor. And the term "BS" may include their some or all functions, each BS can provide communication coverage to a specific geographic region. The term "a cell" may refer to a BS and/or its coverage area, which depends on the context in which this term is used. Where there is no confusion, the terms "cell" and "BS" are interchangeable.

In the embodiments of the present disclosure, the term "User Equipment (UE)" or "Terminal Equipment (TE) or Terminal Device" refers to, for example, a device that accesses a communication network and receives network services through a network device. The terminal equipment can be fixed or mobile, and can also be referred to as Mobile Station (MS), a terminal, Subscriber Station (SS), Access Terminal (AT), IAB-MT, a station and so on.

The terminal equipment may include but be not limited to the following devices: Cellular Phone, Personal Digital Assistant (PDA), a wireless modem, a wireless communication device, a handheld device, a machine-type communication device, a laptop computer, a cordless phone, a smart phone, a smart watch, a digital camera and so on.

For another example, under a scenario such as Internet of Things (IoT), the terminal equipment may also be a machine or apparatus for monitoring or measurement, for example may include but be not limited to: a Machine Type Communication (MTC) terminal, a vehicle-mounted communication terminal, a Device to Device (D2D) terminal, a Machine to Machine (M2M) terminal and so on.

Moreover, the term "a network side" or "a network device side" refers to a side of a network, may be a base station, and may include one or more network devices as described above. The term "a user side" or "a terminal side" or "a terminal equipment side" refers to a side of a user or terminal, may be a UE, and may include one or more terminal equipment as described above. If it is not specifically mentioned herein, "a device" may refer to a network device, or may refer to a terminal equipment.

The scenarios of the embodiments of the present disclosure are described through the following examples, however the present disclosure is not limited to these.

FIG. 1 is a schematic diagram of a communication system in the embodiments of the present disclosure, schematically describes situations by taking a terminal equipment and a network device as examples, as shown in FIG. 1, a communication system 100 may include a network device 101 and a terminal equipment 102. For simplicity, FIG. 1 only takes one terminal equipment and one network device as examples for description, however the embodiments of the present disclosure are not limited to these, for example there may be multiple terminal equipment.

In the embodiments of the present disclosure, transmission of existing or further implementable services can be carried out between the network device 101 and the terminal equipment 102. For example, these services may include but be not limited to: enhanced Mobile Broadband (eMBB), massive Machine Type Communication (mMTC), Ultra-Reliable and Low-Latency Communication (URLLC) and so on.

In an unlicensed (or shared) frequency band, a SSB may not be transmitted due to LBT failure. In NR Rel-16, in order to ensure coverage of unlicensed frequency bands for FR1 (410 MHz-7125 MHz), compared to licensed frequency bands in the same frequency range (FR1), more candidate SSBs are predefined in a half frame (5 ms). Specifically, in a case where a Sub-Carrier Spacing (SCS) is 15 kHz for SSBs, the number of candidate SSBs is 10, and in a case where the SCS for the SSBs is 30 kHz, the number of candidate SSBs is 20.

For the predefined candidate SSBs in the half-frame, a candidate SSB index for each candidate SSB and a DMRS sequence used at the time of transmission are predefined.

Figure 2:
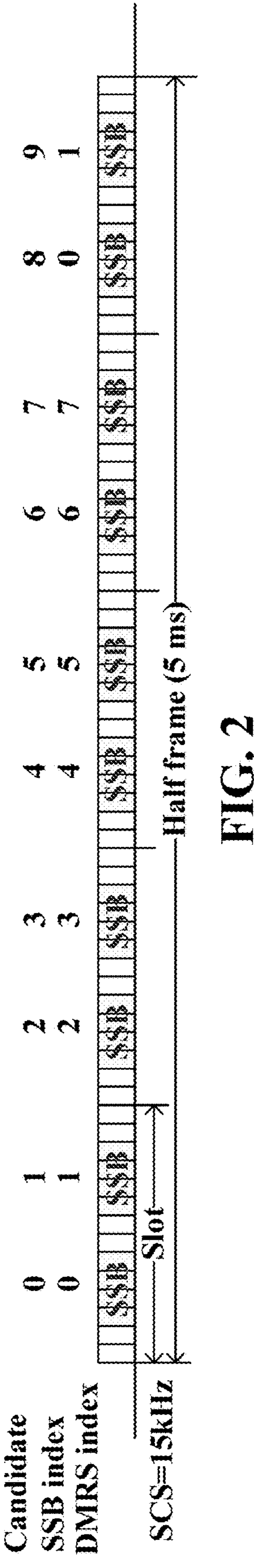
FIG. 2 is an example diagram of candidate SSBs in a case where a SCS is 15 kHz.

FIG. 2 is an example diagram of predefined candidate SSBs in a half frame in a case where a SCS is 15 kHz, as shown in FIG. 2, the candidate SSBs correspond to candidate SSB indexes (0 to 9) one by one in an ascending order of symbols in the half frame. That is, the candidate SSB index is used to represent a time-domain position of a SSB in the half frame.

On the other hand, FIG. 2 further simply shows a correspondence relation between a candidate SSB index and a DMRS sequence that should be used in a SSB. Specifically, for SSBs of a cell, a DMRS sequence in a SSB with a specific candidate SSB index is determined according to the lower 3 bits of the candidate SSB index. Assume that a DMRS index (0 to 7) is used to represent different DMRS sequences generated according to the lower 3 bits of the candidate SSB index, and a correspondence relationship between the candidate SSB index and the DMRS index is shown in FIG. 2.

Figure 3:
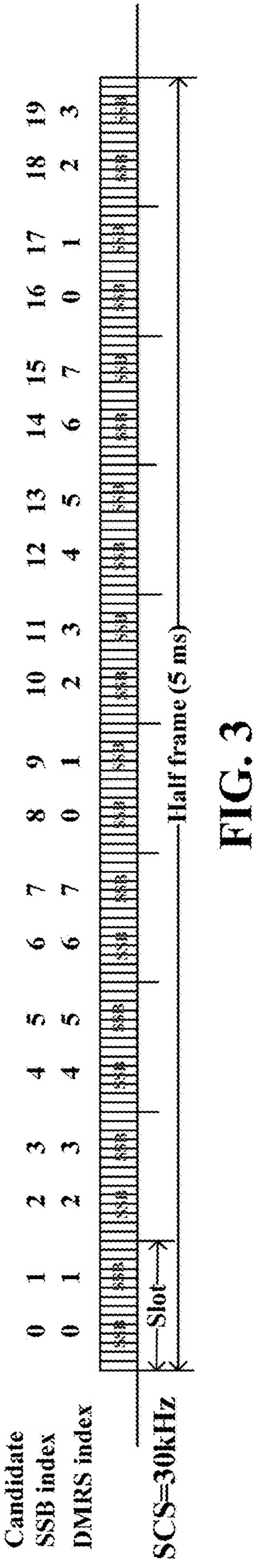
FIG. 3 is an example diagram of candidate SSBs in a case where a SCS is 30 kHz.

FIG. 3 is an example diagram of predefined candidate SSBs in a half frame in a case where a SCS is 30 kHz, as shown in FIG. 3, the candidate SSBs correspond to candidate SSB indexes (0 to 19) one by one in an ascending order of symbols in the half frame. That is, the candidate SSB index is used to represent a time-domain position of a SSB in the half frame.

On the other hand, FIG. 3 further simply shows a correspondence relation between a candidate SSB index and a DMRS sequence that should be used in a SSB. Specifically, for SSBs of a cell, a DMRS sequence in a SSB with a specific candidate SSB index is determined according to the lower 3 bits of the candidate SSB index. Assume that a DMRS index (0 to 7) is used to represent different DMRS sequences generated according to the lower 3 bits of the candidate SSB index, and a correspondence relationship between the candidate SSB index and the DMRS index is shown in FIG. 3.

On the other hand, a SSB may be transmitted using a beam. For unlicensed frequency bands, in order to ensure coverage of each direction, multiple candidate SSBs may correspond to the same direction within a discovery burst transmission window or half frame. Alternatively, SSBs with (corresponding to) different candidate SSB indexes (or, with (corresponding to) different DMRS indexes) can be QCLed (Quasi Co-Location).

For unlicensed frequency bands, a terminal equipment may determine a SSB index according to $$\left(N_{DM-RS}^{PBCH} \bmod N_{SSB}^{QCL}\right) \text{ or } \left(\bar{\imath} \bmod N_{SSB}^{QCL}\right),$$

wherein $\bar{\imath}$ is a candidate SSB index, $$N_{DM-RS}^{PBCH}$$

is an index of DMRS sequence (DMRS index) transmitted in a PBCH of a corresponding SSB;

$$N_{SSB}^{QCL}$$

is provided by information indicating a QCL relation between SSBs, or is obtained from a Main Information Block (MIB) provided by a SSB. Values of $$N_{SSB}^{QCL}$$

e.g. includes 1, 2, 4, 8. For example, it can be described in Table 1:

TABLE 1

| |
|---|
| a UE assumes that SS/PBCH blocks in a serving cell that are within a same discovery burst transmission window or across discovery burst transmission windows are quasi co-located with respect to average gain, quasi co-location 'typeA' and 'typeD' properties, when applicable [6, TS 38.214], if a value of ($N_{DM-RS}^{PBCH}$ mod $N_{SSB}^{QCL}$) is same among the SS/PBCH blocks. |

That is, a SSB index is used to represent a QCL relation between SSBs. For the SSBs having the same SSB index, a terminal equipment assumes that these SSBs are QCLed. According to the above calculation method, in a case where a value of $$N_{SSB}^{QCL}$$

is given, a SSB index corresponding to a predefined candidate SSB in a half frame can be uniquely determined.

Figure 4:
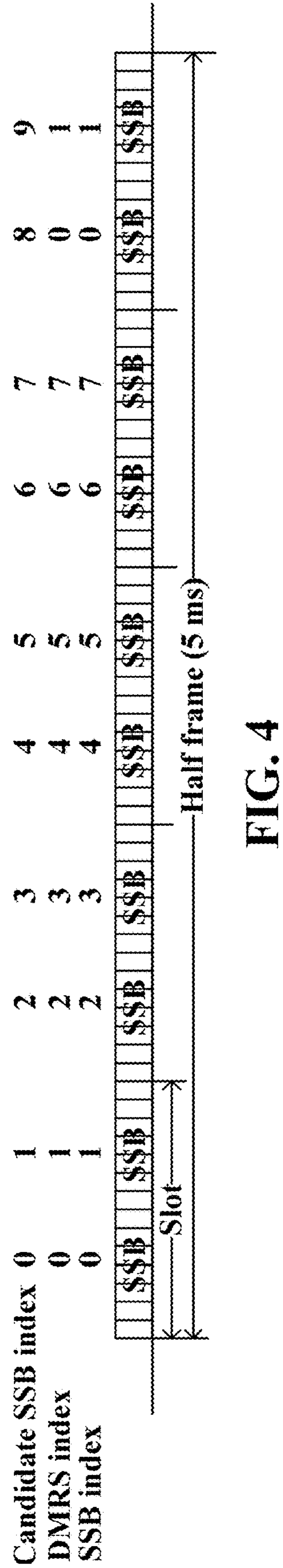
FIG. 4 is an example diagram of determining SSB indexes.

FIG. 4 is an example diagram of SSB indexes of a predefined candidate SSB in a half frame in a case where SSB SCS=15 kHz and $$N_{SSB}^{QCL} = 8.$$

According to the above calculation method, a value range of the SSB index is 0 to 7, which correspond to a predefined candidate SSB in a half frame one by one circularly.

Figure 5:
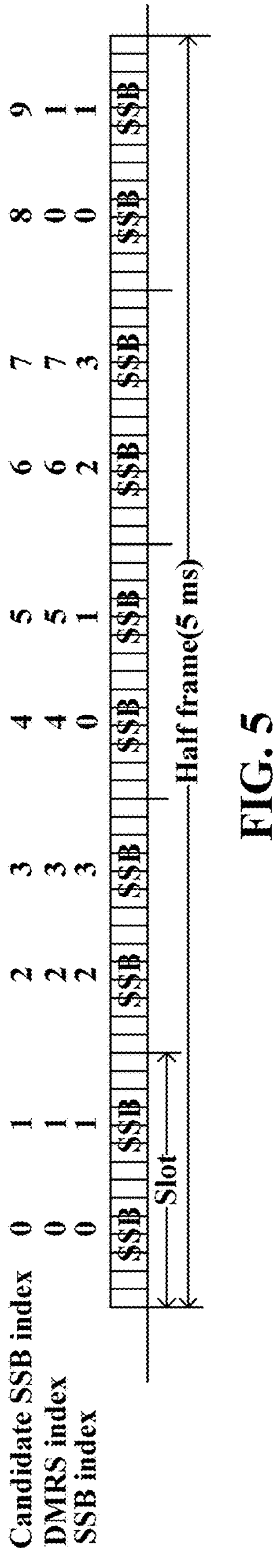
FIG. 5 is another example diagram of determining SSB indexes.

FIG. 5 is an example diagram of SSB indexes of a predefined candidate SSB in a half frame in a case where SSB SCS=15 kHz and $$N_{SSB}^{QCL} = 4.$$

According to the above calculation method, a value range of the SSB index is 0 to 3, which correspond to a predefined candidate SSB in a half frame one by one circularly.

Figure 6:
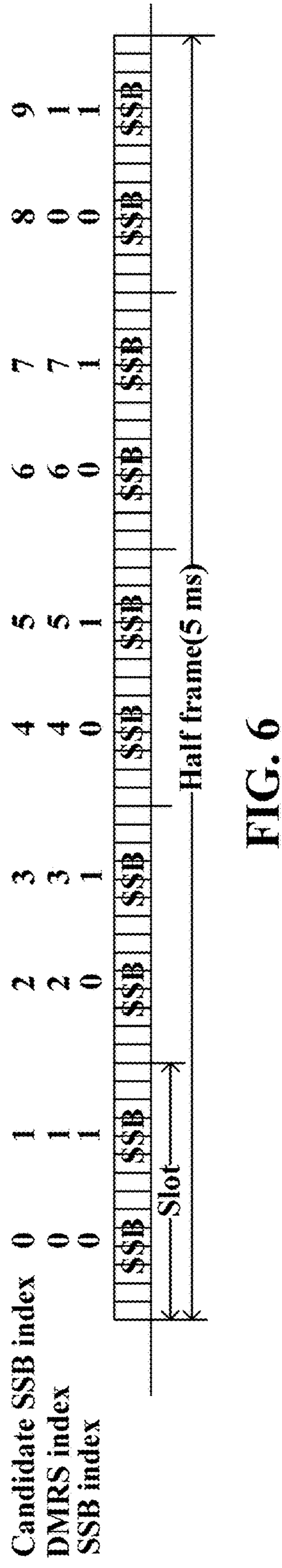
FIG. 6 is another example diagram of determining SSB indexes.

FIG. 6 is an example diagram of SSB indexes of a predefined candidate SSB in a half frame in a case where SSB SCS=15 kHz and $$N_{SSB}^{QCL} = 2.$$

According to the above calculation method, a value range of the SSB index is 0 to 1, which correspond to a predefined candidate SSB in a half frame one by one circularly.

Figure 7:
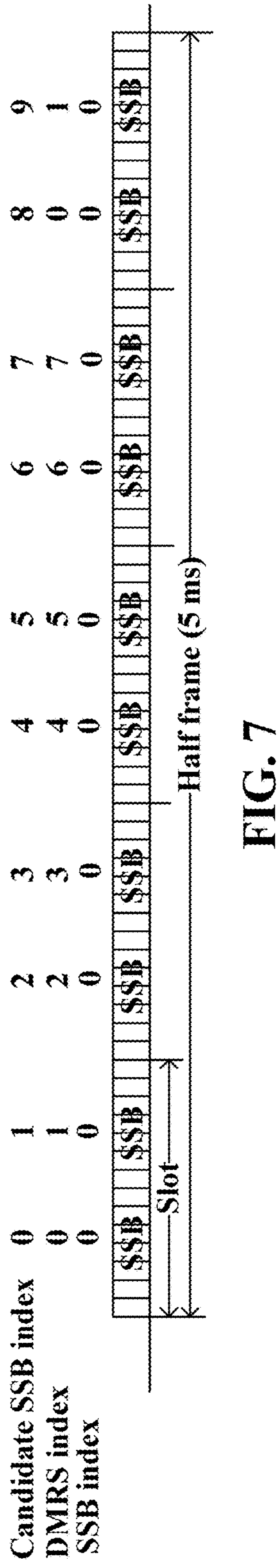
FIG. 7 is another example diagram of determining SSB indexes.

FIG. 7 is an example diagram of SSB indexes of a predefined candidate SSB in a half frame in a case where SSB SCS=15 kHz and $$N_{SSB}^{QCL} = 1.$$

According to the above calculation method, a value range of the SSB index is 0, which corresponds to a predefined candidate SSB in a half frame.

On the other hand, in NR Rel-15/Rel-16 systems, a terminal equipment may perform measurements for RRM/measurements for RLM/measurements for CSI feedback based on SSBs.

In order to support measurement by the terminal equipment based on the SSB, a network device (such as a base station) will transmit the SSB and may transmit configuration information (or called measurement configuration) of SSB-based measurement to the terminal equipment.

For example, for cell re-selection and measurement in connected state, a base station may transmit information for the cell re-selection via SIB2, SIB3 and SI134, and may transmit information for the measurement in connected state via RRCReconfiguration (or RRCResume). In the above information, for a SSB at a certain frequency location (a frequency location of a SSB for example is subject to a location of a center frequency point of the SSB), a base station may indicate a SSB to be measured in a SMTC measurement duration by using an information field (such as ssb-ToMeasure). For example, for unlicensed frequency bands for FR1, it is to adopt mediumBitmap in SSB-ToMeasure to indicate ssb-ToMeasure.

For example, the SSB to be measured in the SMTC measurement duration (such as a SMTC window duration) means SSBs that a terminal equipment may need to be measured in a configured SMTC measurement duration; the terminal equipment does not need to measure other SSBs other than the SSBs indicated to be measured.

However, the inventor finds that according to the description about mediumBitmap in SSB-ToMeasure in a current specifications, for unlicensed frequency bands, on the one hand, a bit in the above information field (ssb-ToMeasure or mediumBitmap) is used to indicate whether an SSB with the same SSB index in the SMTC measurement duration is an SSB to be measured, on the other hand, a value of a bit in the above information field (ssb-ToMeasure or mediumBitmap) is limited to a value indicated by an information field (ssb-PositionQCL) indicating a QCL relation between SSBs.

However, based on the above method, in some cases, a network device (a base station) may not be able to indicate a SSB to be measured in a SMTC measurement duration by using the above information domain (ssb-ToMeasure or mediumBitmap). And, the above method can further greatly reduce the flexibility of a network/base station configuration and increase the complexity and power consumption of UE measurements.

For example, for intra-frequency cell re-selection, the inter-frequency cell re-selection and measurement in connected state, in SIB3, SIB4 and RRCReconfiguration, for a SSB at a certain frequency location, may respectively include one or more ssb-PositionQCLs (configuration via a manner of a list, the list may include one or more ssb-PositionQCLs), or may not include a ssb-PositionQCL (i.e., the ssb-PositionQCL is optional). The ssb-PositionQCL is cell-specific, that is, one ssb-PositionQCL is only for one cell (identified by PCI) that transmits a SSB at the frequency location, and in a case of including multiple ssb-PositionQCLs, different ssb-PositionQCLs are for different cells (PCI identities of the cells are different) that transmit SSBs at the frequency location.

On the other hand, in SIB3, SIB4 and RRCReconfiguration, ssb-ToMeasure is frequency-specific, that is, for a SSB at a certain frequency location, there is only one ssb-ToMeasure, one ssb-ToMeasure is for all measured cells that transmit SSBs at the frequency location, and in a case where ssb-ToMeasure is not included, a UE needs to measure all SSBs in a SMTC measurement duration.

Considering the above two aspects, for a SSB at a certain frequency location, if two or more ssb-Position QCLs (for different cells respectively) are to be included, a network device and/or a terminal equipment will not be able to uniquely determine a value of a bit of a frequency-specific ssb-ToMeasure (or mediumBitmap) is limited by which ssb-PositionQCL. Accordingly, the network device may not be able to correctly set a value of a bit of ssb-ToMeasure (or mediumBitmap), and the terminal equipment may not be able to determine whether an indication of ssb-ToMeasure conforms to a requirement, which may affect processing of this information by the terminal equipment (for example, it maybe ignore this information). Thus, in this case, a network device (a base station) may not be able to indicate a SSB to be measured in a SMTC measurement duration by using the above information domain (ssb-ToMeasure or mediumBitmap).

Moreover, since ssb-PositionQCL is cell-specific and ssb-ToMeasure is frequency-specific, the above method will greatly reduce the flexibility of a network configuration.

On the one hand, in SIB3 and SIB4, for a SSB at a certain frequency location, if ssb-PositionQCL is included, the number of included ssb-PositionQCLs should be the same as the number of cells included in a neighbor cells list, and these ssb-PositionQCLs correspond one by one to the cells in the neighbor cells list in a sequence they are in the list. In this way, in order to avoid the problem mentioned above, for a SSB at a certain frequency location, only one ssb-PositionQCL may be included, thus a neighbor cells list may also include one cell, thereby limiting the flexibility of a network/base station configuration, it may further increase the complexity and power consumption of the measurement by a terminal equipment (the terminal equipment needs to blind detect cells outside of the neighbor cells list).

On the other hand, for a SSB at a certain frequency location, if one ssb-PositionQCL is included, and a value indicated by the ssb-PositionQCL is 2, according to the above method, only first two bits of ssb-ToMeasure (or mediumBitmap) are valid, resulting in that all cells that transmit SSBs at this frequency location are only able to indicate a SSB to be measured in a SMTC measurement duration based on these 2 bits, which limits the flexibility of a network/base station configuration.

The inventor further finds that currently, for whether to support measurement of an idle state or an inactive state, definition of a terminal equipment capability is per FR. That is, when a terminal equipment reports a terminal equipment capability to a network device (such as a base station), it can report whether to support idle/inactive measurement respectively for FR1 and FR2. Since the unlicensed frequency band defined by Rel-16 is a part of the FR1, if a terminal equipment reports to support idle/inactive measurements for the FR1, a network device may also be configured to perform measurements in the unlicensed frequency band.

Currently, for idle/inactive measurements, a network device may transmit information for idle/inactive measurements via SIB 4, SIB 11 and RRCRelease. In the above information, for a SSB at a certain frequency location, a network device may indicate a SSB to be measured in a SMTC measurement duration by using an information field (e.g., ssb-ToMeasure), but a QCL relation between SSBs cannot be indicated in SIB 11 and RRCRelease.

According to the above method for ssb-ToMeasure to indicate a SSB to be measured, for an unlicensed frequency band, a terminal equipment needs to determine a SSB to be measured as indicated by ssb-ToMeasure according to a QCL relation between SSBs as indicated by a network device. Thus, when a network device transmits ssb-ToMeasure via SIB 11 or RRCRelease to indicate a SSB to be measured in a SMTC measurement duration, a terminal equipment cannot determine the SSB to be measured in a corresponding frequency location based on this information. As a result, the terminal equipment cannot perform corresponding measurements.

For at least one of the above problems, the following further describes the embodiments of the present disclosure. In the embodiments of the present disclosure, "when . . . ", "in a case where . . . ", "for a situation in which . . . " and "if . . . " represent on the basis of one or more conditions or states, etc., in addition, these expressions are interchangeable. Moreover, "indicate" may explicitly contain certain information for notification, or may implicitly notify via certain features, etc.

In the following description, without causing confusion, the terms "uplink control signal" and "Uplink Control Information (UCI)" or "Physical Uplink Control Channel (PUCCH)" or "PUSCH transmission" are interchangeable, and the terms "uplink data signal" and "uplink data information" or "Physical Uplink Shared Channel (PUSCH)" or "PUSCH transmission" are interchangeable.

The terms "downlink control signal" and "Downlink Control Information (DCI)" or "Physical Downlink Control Channel (PDCCH)" are interchangeable, and the terms "downlink data signal" and "downlink data information" or "Physical Downlink Shared Channel (PDSCH)" are interchangeable.

Moreover, transmitting or receiving a PUSCH can be understood as transmitting or receiving uplink data information carried by the PUSCH, transmitting or receiving a PUCCH can be understood as transmitting or receiving uplink control information carried by the PUCCH, transmitting or receiving a PRACH can be understood as transmitting or receiving a preamble carried by the PRACH; an uplink signal may include an uplink data signal and/or an uplink control signal and/or an uplink reference signal and/or a random access channel, etc., or may also be referred to as UL transmission or uplink information or uplink channel. Transmitting an uplink signal on an uplink resource can be understood as transmitting the uplink signal by using the uplink resource.

Embodiments of a First Aspect

The embodiments of the present disclosure provide a measurement method, for example for cell reselection or measurement in connected state.

Figure 8:
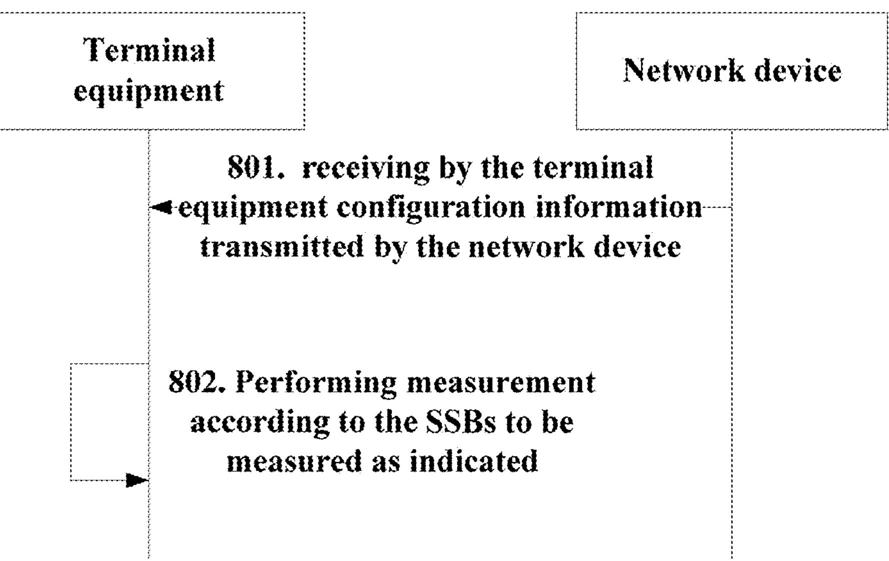
FIG. 8 is a schematic diagram of a measurement method in the embodiments of the present disclosure.

FIG. 8 is a schematic diagram of a measurement method in the embodiments of the present disclosure, it is described from a terminal equipment and a network device. As shown in FIG. 8, the method includes:

801, a terminal equipment receives configuration information transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks; and

802, the terminal equipment performs measurement according to the synchronization signal blocks to be measured indicated by the first indication information.

It should be noted that the above FIG. 8 is only schematic description of the embodiments of the present disclosure, but the present disclosure is not limited to this. For example, an execution step of each operation can be adjusted appropriately, moreover other some operations can be increased or reduced. Persons skilled in the art can make appropriate modifications according to the above contents, not limited to the records in the above FIG. 8.

In some embodiments, the above configuration information is for unlicensed frequency bands or licensed frequency bands; in addition, the first indication information, the second indication information and the third indication information mentioned above are, for example, for SSBs at the same frequency location.

In some embodiments, the SSB to be measured indicated by the first indication information is a SSB to be measured in a SMTC measurement duration. That is, the first indication information is used for indicating a SSB to be measured in a SMTC measurement duration. The SMTC measurement duration, for example, is configured by a network device via RRC signaling. A terminal equipment performs a measurement based on a SSB to be measured indicated by the first indication information in the SMTC measurement duration, instead of based on other SSB which is outside the SMTC measurement duration and other SSB which is not indicated by the first indication information as a SSB to be measured in the SMTC measurement duration.

In some embodiments, the first indication information, for example, is frequency-specific. That is, for a SSB at a certain frequency location, configuration information only includes one first indication information, one first indication information is applicable to multiple cells that transmit the SSB at the same frequency location.

In some embodiments, the second indication information is used to indicate a frequency-specific quasi-co-location relationship between synchronization signal blocks, and the third indication information is used to indicate a cell-specific quasi-co-location relationship between synchronization signal blocks. The second indication information is frequency-specific, and the third indication information is cell-specific.

That is, for a SSB at a certain frequency location, configuration information only includes one second indication information, one second indication information is applicable to multiple cells that transmit the SSB at the same frequency location, while configuration information may include multiple third indication information, and one third indication information is only applicable to one cell that transmits the SSB at that frequency location.

For example, for a SSB at a certain frequency location, if the configuration information includes third indication information corresponding to a cell, a terminal equipment determines a quasi-co-location relationship between synchronization signal blocks of the cell according to the third indication information, and for a cell that is not provided with the third indication information, the terminal equipment determines the quasi-co-location relationship between the synchronization signal blocks of the cell according to the second indication information.

In some embodiments, for unlicensed frequency bands, the above configuration information must include the second indication information.

In some embodiments, a frequency location of a SSB to be measured is, for example, determined by a frequency location of a SSB in a serving cell, or is configured by RRC signaling. For example, for intra-frequency cell re-selection, a frequency location of a SSB to be measured is determined by a frequency location of a SSB in a serving cell. For inter-frequency cell re-selection, it is configured e.g. by dl-CarrierFreq included in SIB4, and for measurement in connected state, it is configured e.g. by ssbFrequency included in measObjectNR.

In some embodiments, the first indication information is synchronization signal block measurement information (such as ssb-ToMeasure), the second indication information is synchronization signal block common quasi-co-location information (such as ssb-PositionQCL-Common), and the third indication information is synchronization signal block quasi-co-location information (such as ssb-PositionQCL).

For unlicensed frequency bands for FR1, ssb-ToMeasure, for example, adopts medium Bitmap in SSB-ToMeasure to indicate. For unlicensed frequency bands in higher frequency bands (such as FR2 or 52.6-71 GHz), ssb-ToMeasure, for example, adopts longBitmap in SSB-ToMeasure to indicate.

The synchronization signal block measurement information, the synchronization signal block common quasi-co-location information and the synchronization signal block quasi-co-location information are taken as examples for the following description. The synchronization signal block measurement information e.g. is ssb-ToMeasure, but the present disclosure is not limited to this, for example may further be ssb-ToMeasure-r16 or ssb-ToMeasure-r17, etc. The synchronization signal block common quasi-co-location information e.g. is ssb-PositionQCL-Common, but the present disclosure is not limited to this, for example may further be ssb-PositionQCL-Common-r16 or ssb-PositionQCL-Common-r17, etc. The synchronization signal block quasi-co-location information e.g. is ssb-PositionQCL, but the present disclosure is not limited to this, for example may further be ssb-PositionQCL-cell, ssb-PositionQCL-r16 or ssb-PositionQCL-r17, etc. The present disclosure does not limit specific information names.

In some embodiments, one or more bits of the first indication information is/are set according to a value indicated by the second indication information. For example, one or more bits of the synchronization signal block measurement information (such as ssb-ToMeasure) is/are set according to the synchronization signal block common quasi-co-location information (ssb-PositionQCL-Common). That is, a value of a bit of the first indication information (such as ssb-ToMeasure) is limited to the synchronization signal block common quasi-co-location information (ssb-PositionQCL-Common).

In some embodiments, a K-th (k>=1) bit in the first indication information is set to be 0; where, K is greater than a value indicated by the second indication information.

In some embodiments, the number of synchronization signal blocks actually transmitted in a cell is not greater than the number of 1s in the first indication information.

In some embodiments, the k=1 bit in the first indication information is a left most bit.

For example, in a case where the synchronization signal block common quasi-co-location information is configured, the K-th bit in the first indication information is set to be 0, where K is greater than a value of the synchronization signal block common quasi-co-location information. Further, for example, the number of synchronization signal blocks actually transmitted in a specific cell is not greater than the number of 1s in the first indication information.

ssb-ToMeasure is taken as an example to illustrate the first indication information, and it is assumed that the first indication information (ssb-ToMeasure) in the embodiments of the present disclosure adopts mediumBitmap in SSB-ToMeasure to indicate, but the present disclosure is not limited to this.

Table 2 is an example of description of mediumBitmap in SSB-ToMeasure.

TABLE 2

| mediumBitmap |
| --- |
| Bitmap when maximum number of SS/PBCH blocks per half frame equals to 8 as defined in TS 38.213 [13], clause 4.1. For operation with shared spectrum channel access, if the k-th bit is set to 1, the UE assumes that one or more SS/PBCH blocks within the discovery burst transmission window with candidate SS/PBCH block indexes corresponding to SS/PBCH block index equal to k − 1 may be transmitted; if the k-th bit is set to 0, the UE assumes that the corresponding SS/PBCH block(s) are not transmitted. If ssb-PositionQCL-Common is configured, the k-th bit is set to 0, where k > ssb-PositionQCL-Common and the number of actually transmitted SS/PBCH blocks is not larger than the number of 1's in the bitmap. |

-

Table 3 is another example of description of mediumBitmap in SSB-ToMeasure.

TABLE 3

| SSB-ToMeasure field descriptions |
| --- |
| mediumBitmap<br>Bitmap when maximum number of SS/PBCH blocks per half frame equals to 8 as defined in TS 38.213 [13], clause 4.1. For operation with shared spectrum channel access, if the k-th bit is set to 1, the UE assumes that one or more SS/PBCH blocks within the SMTC measurement duration with candidate SS/PBCH block indexes corresponding to SS/PBCH block index equal to k − 1 are to be measured; if the k-th bit is set to 0, the corresponding SS/PBCH block(s) are not be measured. If ssb-PositionQCL-Common is configured, the k-th bit is set to 0, where k > ssb-PositionQCL-Common and the number of actually transmitted SS/PBCH blocks is not larger than the number of 1's in the bitmap. |

In some embodiments, the second indication information and the third indication information adopt SSB-Position-QCL-Relation to indicate, their value range is e.g. {1, 2, 4, 8}. Table 4 is an example of SSB-PositionQCL-Relation.

TABLE 4

| SSB-PositionQCL-Relation information element |
|---|
| -- ASN1START<br>-- TAG-SSB-POSITIONQCL-RELATION-START<br>SSB-PositionQCL-Relation-r16 ::= ENUMERATED {n1,n2,n4,n8}<br>-- TAG-SSB-POSITIONQCL-RELATION-STOP<br>-- Value n1 corresponds to 1, value n2 corresponds to 2 and so on. |

In some embodiments, for a cell not providing the third indication information, the number of synchronization signal blocks that are actually transmitted is not greater than the number of bits whose value is 1 in the first indication information, and for a cell providing the third indication information, the number of synchronization signal blocks that are actually transmitted is not greater than a value indicated by the third indication information.

For example, in a case where the synchronization signal block common quasi-co-location information is configured, the K-th bit in the first indication information is set to be 0, where K is greater than a value of the synchronization signal block common quasi-co-location information. Further, for example, for a specific cell not providing the synchronization signal block quasi-co-location information, the number of synchronization signal blocks that are actually transmitted is not greater than the number of bits whose value is 1 in the first indication information, and for a specific cell providing the synchronization signal block quasi-co-location information, the number of synchronization signal blocks that are actually transmitted is not greater than a value of the synchronization signal block quasi-co-location information.

Table 5 is another example of description of mediumBitmap in SSB-ToMeasure.

TABLE 5

| mediumBitmap |
|---|
| Bitmap when maximum number of transmitted SS/PBCH blocks per half frame equals to 8 as defined in TS 38.213 [13], clause 4.1. For operation with shared spectrum channel access, if the k-th bit is set to 1, the UE assumes that one or more SS/PBCH blocks within the discovery burst transmission window with candidate SS/PBCH block indexes corresponding to SS/PBCH block index equal to k − 1 may be transmitted; if the k-th bit is set to 0, the UE assumes that the corresponding SS/PBCH block(s) are not transmitted. If ssb-PositionQCL-Common is configured, the k-th bit is set to 0, where k > ssb-PositionQCL-Common. The number of actually transmitted SS/PBCH blocks is not larger than the number of 1's in the bitmap for a cell not provided with ssb-PositionQCL and is not larger than ssb-PositionQCL for a cell provided with ssb-PositionQCL. |

In some embodiments, for a cell not providing the third indication information, the number of synchronization signal blocks that are actually transmitted is not greater than a value indicated by the second indication information, and for a cell providing the third indication information, the number of synchronization signal blocks that are actually transmitted is not greater than a value indicated by the third indication information.

In some embodiments, for a cell not providing the third indication information, the number of synchronization signal blocks that are actually transmitted is not greater than a minimum value of a value indicated by the second indication information and the number of bits whose value is 1 in the first indication information, and for a cell providing the third indication information, the number of synchronization signal blocks that are actually transmitted is not greater than a minimum value of a value indicated by the third indication information and the number of bits whose value is 1 in the first indication information.

In some embodiments, for a cell not providing the third indication information, the number of synchronization signal blocks that are actually transmitted is not greater than a minimum value of a value indicated by the second indication information and the number of bits whose value is 1 in the first indication information, and for a cell providing the third indication information, the number of synchronization signal blocks that are actually transmitted is not greater than a minimum value of a value indicated by the third indication information and the number of bits of 1 to M bits whose value is 1 in the first indication information, M is a value indicated by the third indication information.

In some embodiments, for a cell not providing the third indication information, the number of synchronization signal blocks that are actually transmitted is not greater than the number of bits whose value is 1 in the first indication information, and for a cell providing the third indication information, the number of synchronization signal blocks that are actually transmitted is not greater than a minimum value of the number of bits of 1 to M bits whose value is 1 in the first indication information, M is a value indicated by the third indication information.

Each indication information is described above, and a behavior of a terminal equipment is further described below.

In some embodiments, for a cell providing the third indication information, a terminal equipment determines a mapping relationship between a synchronization signal block and a synchronization signal block index (SSB index) according to the third indication information of the cell, and determines synchronization signal blocks to be measured of the cell according to the determined mapping relationship and the first indication information; and for a cell not providing the third indication information, the terminal equipment determines a mapping relationship between a synchronization signal block and a synchronization signal block index (SSB index) according to the second indication information, and determines synchronization signal blocks to be measured of the cell according to the determined mapping relationship and the first indication information.

For example, if a cell is configured with ssb-PositionQCL, a terminal equipment obtains a SSB index according to ssb-PositionQCL, and then determines a SSB to be measured of the cell according to ssb-ToMeasure, otherwise obtains a SSB index according to ssb-PositionQCL-Common and then determines a SSB to be measured of the cell according to ssb-ToMeasure.

Figure 9:
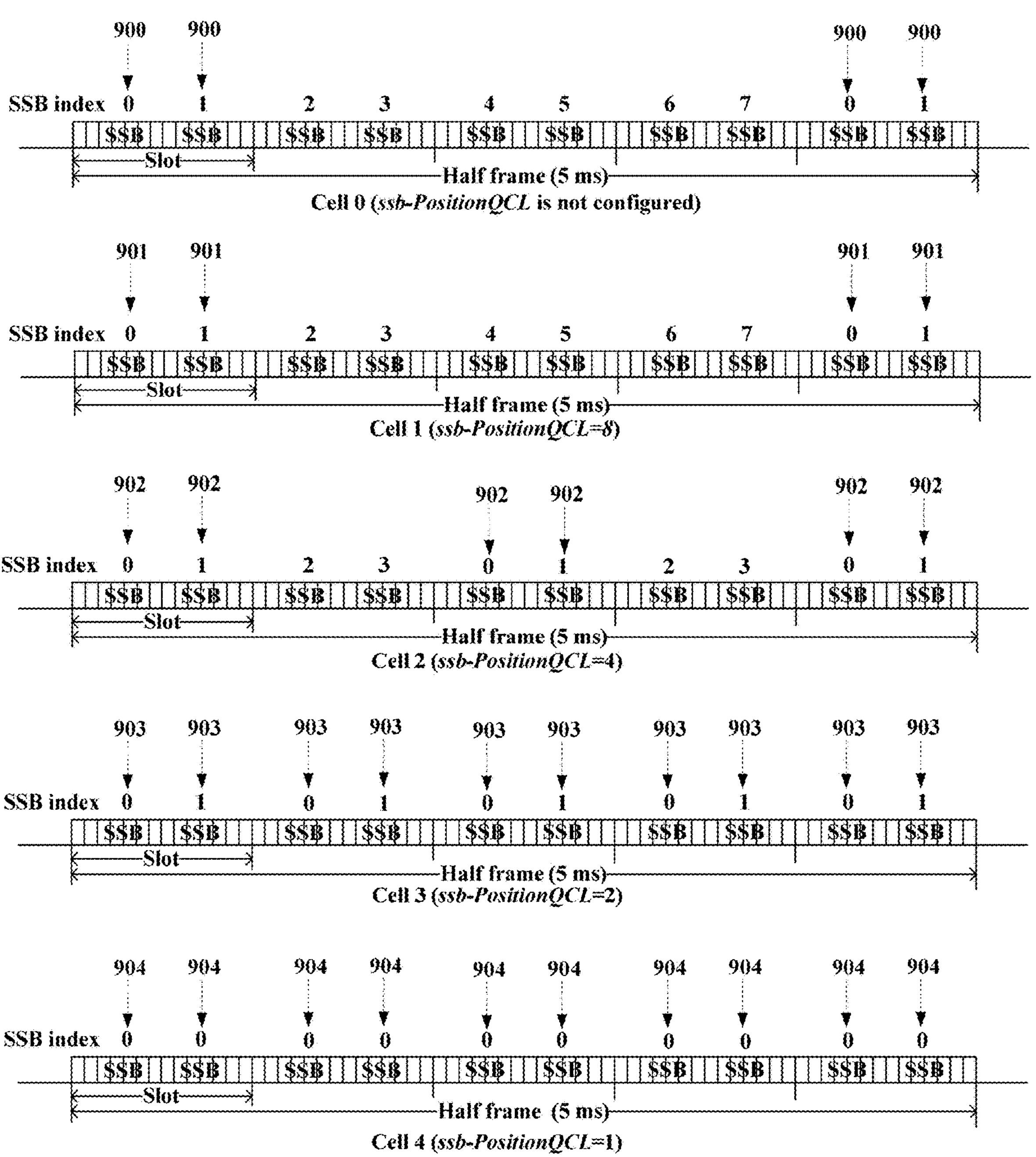
FIG. 9 is an example diagram of determining SSBs to be measured in the embodiments of the present disclosure.

FIG. 9 is an example diagram of determining SSBs to be measured in the embodiments of the present disclosure, where SCS=15 kHz, assuming ssb-PositionQCL-Common=8, ssB-ToMeasure=11000000.

As shown in FIG. 9, cell 0 is not configured with ssb-PositionQCL, then according to ssb-PositionQCL-Common=8, SSB indexes are not limited (still being 0 to 7); according to ssB-ToMeasure=11000000, candidate SSBs corresponding to SSB index=0 or 1 of the cell are SSBs to be measured (as shown in 900). Namely, a value range of the SSB index is 0 to 7, which correspond to predefined candidate SSBs in a half frame one by one circularly.

As shown in FIG. 9, cell 1 is configured with ssb-PositionQCL=8, then according to ssb-PositionQCL=8, SSB indexes are not limited (still being 0 to 7); according to ssB-ToMeasure=11000000, candidate SSBs corresponding to SSB index=0 or 1 of the cell are SSBs to be measured (as shown in 901). Namely, a value range of the SSB index is 0 to 7, which correspond to predefined candidate SSBs in a half frame one by one circularly.

As shown in FIG. 9, cell 2 is configured with ssb-PositionQCL=4, then according to ssb-PositionQCL=4, SSB indexes are limited to four (0 to 3); according to ssB-ToMeasure=11000000, candidate SSBs corresponding to SSB index=0 or 1 of the cell are SSBs to be measured (as shown in 902). Namely, a value range of the SSB index is 0 to 3, which correspond to predefined candidate SSBs in a half frame one by one circularly.

As shown in FIG. 9, cell 3 is configured with ssb-PositionQCL=2, then according to ssb-PositionQCL=2, SSB indexes are limited to two (0 to 1); according to ssB-ToMeasure=11000000, candidate SSBs corresponding to SSB index=0 or 1 of the cell are SSBs to be measured (as shown in 903). Namely, a value range of the SSB index is 0 to 1, which correspond to predefined candidate SSBs in a half frame one by one circularly.

As shown in FIG. 9, cell 4 is configured with ssb-PositionQCL=1, then according to ssb-PositionQCL=1, SSB indexes are limited to one (0); according to ssB-ToMeasure=11000000, candidate SSBs corresponding to SSB index=0 or 1 of the cell are SSBs to be measured (as shown in 904). Namely, a value range of the SSB index is 0, which corresponds to predefined candidate SSBs in a half frame.

In some embodiments, for a cell providing the third indication information and a cell not providing the third indication information, the terminal equipment determines a first mapping relationship between a synchronization signal block and a synchronization signal block index (SSB index) according to the second indication information, and the terminal equipment determines synchronization signal blocks to be measured according to the first mapping relationship and the first indication information.

For example, a terminal equipment obtains a SSB index (for example, called a virtual SSB index) according to ssb-PositionQCL-Common, and then determines a SSB that needs to be measured, of the cell, according to ssb-ToMeasure.

Figure 10:
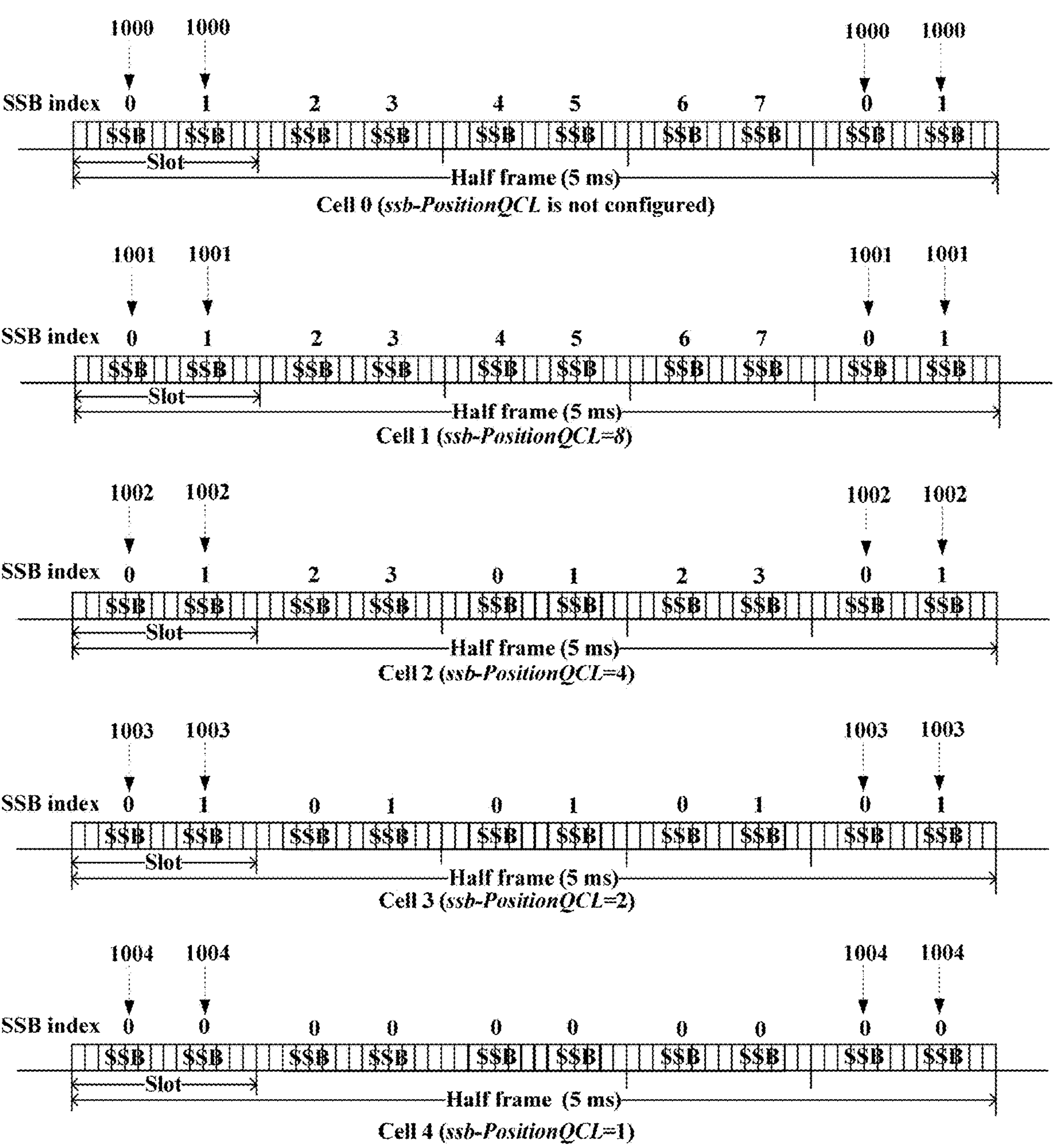
FIG. 10 is another example diagram of determining SSBs to be measured in the embodiments of the present disclosure.

FIG. 10 is another example diagram of determining SSBs to be measured in the embodiments of the present disclosure, where SCS=15 kHz, assuming ssb-PositionQCL-Common=8, ssB-ToMeasure=11000000.

As shown in FIG. 10, cell 0 is not configured with ssb-PositionQCL, according to ssb-PositionQCL-Common=8, the number of virtual SSB indexes is 0 to 7 (corresponding to a first mapping relationship); according to ssB-ToMeasure=11000000, candidate SSBs corresponding to SSB index=0 or 1 of the cell are SSBs to be measured (as shown in 1000).

As shown in FIG. 10, cell 1 is configured with ssb-PositionQCL=8, then according to ssb-PositionQCL=8, the number of SSB indexes is 0 to 7 (corresponding to a second mapping relationship); according to ssb-PositionQCL-Common=8, the number of virtual SSB indexes is 0 to 7 (corresponding to a first mapping relationship); according to ssB-ToMeasure=11000000, candidate SSBs corresponding to SSB index=0 or 1 of the cell are SSBs to be measured (as shown in 1001).

As shown in FIG. 10, cell 2 is configured with ssb-PositionQCL=4, then according to ssb-PositionQCL=4, the number of SSB indexes is four (0 to 3) (corresponding to a second mapping relationship); according to ssb-PositionQCL-Common=8, the number of virtual SSB indexes is 0 to 7 (corresponding to a first mapping relationship); according to ssB-ToMeasure=11000000, candidate SSBs corresponding to SSB index=0 or 1 of the cell are SSBs to be measured (as shown in 1002).

As shown in FIG. 10, cell 3 is configured with ssb-PositionQCL=2, then according to ssb-PositionQCL=2, the number of SSB indexes is two (0 to 1) (corresponding to a second mapping relationship); according to ssb-PositionQCL-Common=8, the number of virtual SSB indexes is 0 to 7 (corresponding to a first mapping relationship); according to ssB-ToMeasure=11000000, candidate SSBs corresponding to SSB index=0 or 1 of the cell are SSBs to be measured (as shown in 1003).

As shown in FIG. 10, cell 4 is configured with ssb-PositionQCL=1, then according to ssb-PositionQCL=1, the number of SSB indexes is 1 (0) (corresponding to a second mapping relationship); according to ssb-PositionQCL-Common=8, the number of virtual SSB indexes is 0 to 7 (corresponding to a first mapping relationship); according to ssB-ToMeasure=11000000, candidate SSBs corresponding to SSB index=0 or 1 of the cell are SSBs to be measured (as shown in 1004).

Further, for a cell providing the third indication information, a terminal equipment further determines a second mapping relationship between a synchronization signal block and a synchronization signal block index (SSB index) according to the third indication information of the cell, and measures the cell according to the second mapping relationship, and for a cell not providing the third indication information, the terminal equipment further measures the cell according to the first mapping relationship.

In some embodiments, a terminal equipment ignores a K-th bit in the first indication information; wherein for a cell providing the third indication information, K is greater than a value indicated by the third indication information of the cell, and for a cell not providing the third indication information, K is greater than a value indicated by the second indication information.

In some embodiments, one or more bits of the first indication information is/are set according to a maximum value indicated by the second indication information and the third indication information. For example, a K-th bit in the first indication information is set to be 0, wherein K is greater than a maximum value indicated by the first indication information and the second indication information.

Table 6 is another example of description of mediumBitmap in SSB-ToMeasure.

TABLE 6

| mediumBitmap |
| --- |
| Bitmap when maximum number of SS/PBCH blocks per half frame equals to 8 as defined in TS 38.213 [13], clause 4.1. For operation with shared spectrum channel access, if the k-th bit is set to 1, the UE assumes that one or more SS/PBCH blocks within the discovery burst transmission window with candidate SS/PBCH block indexes corresponding to SS/PBCH block index equal to k − 1 may be transmitted; if the k-th bit is set to 0, the UE assumes that the corresponding SS/PBCH block(s) are not transmitted. If ssb-PositionQCL-Common and/or ssb-PositionQCL is configured, the k-th bit is set to 0, where k > the maximum of ssb-PositionQCL-Common and/or ssb-PositionQCL and the number of actually transmitted SS/PBCH blocks is not larger than the number of 1's in the bitmap. |

Table 7 is another example of description of mediumBitmap in SSB-ToMeasure.

TABLE 7

| mediumBitmap |
| --- |
| Bitmap when maximum number of SS/PBCH blocks per half frame equals to 8 as defined in TS 38.213 [13], clause 4.1. For operation with shared spectrum channel access, if the k-th bit is set to 1, the UE assumes that one or more SS/PBCH blocks within the discovery burst transmission window with candidate SS/PBCH block indexes corresponding to SS/PBCH block index equal to k − 1 may be transmitted; if the k-th bit is set to 0, the UE assumes that the corresponding SS/PBCH block(s) are not transmitted. If ssb-PositionQCL-Common and/or ssb-PositionQCL is configured, the k-th bit is set to 0, where k > the maximum of ssb-PositionQCL-Common and/or ssb-PositionQCL. |
| The number of actually transmitted SS/PBCH blocks is not larger than the number of 1's in the bitmap for a cell not provided with ssb-PositionQCL and is not larger than ssb-PositionQCL for a cell provided with ssb-PositionQCL. |

In some embodiments, one or more bits of the first indication information is/are set not according to the third indication information. For example, the first indication information is not defined as follows: in a case where the third indication information is configured, a K-th bit in the first indication information is set to be 0, where K is greater than a maximum value indicated by the third indication information, and the number of synchronization signal blocks actually transmitted is not greater than the number of is in the first indication information.

Table 8 is another example of description of mediumBitmap in SSB-ToMeasure.

TABLE 8

| mediumBitmap |
| --- |
| Bitmap when maximum number of SS/PBCH blocks per half frame equals to 8 as defined in TS 38.213 [13], clause 4.1. For operation with shared spectrum channel access, if the k-th bit is set to 1, the UE assumes that one or more SS/PBCH blocks within the discovery burst transmission window with candidate SS/PBCH block indexes corresponding to SS/PBCH block index equal to k − 1 may be transmitted; if the k-th bit is set to 0, the UE assumes that the corresponding SS/PBCH block(s) are not transmitted. |

In some embodiments, the number of effective locations in the first indication information for a specific cell is a predetermined value, such as 8.

In some embodiments, the configuration information is for cell re-selection, and is carried in a system message; the system message includes, for example, but is not limited to, one or any combination of the following: SIB2, SIB3, SIB4, etc. Or, the configuration information is for measurement in connected state, and is carried in radio resource control (RRC) information, such information includes, for example, but is not limited to, MeasObjectNR, etc.

For example, ssb-ToMeasure may be included in one or any combination of the following information (information element (IE) or message): RRCReconfiguration, measConfig, measObjectToAddModList, measObject, measObjectNR; for specific meanings, relevant technologies may be further referred to.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, one or more bits of first indication information for indicating one or more synchronization signal blocks to be measured is/are set according to second indication information indicating a frequency-specific quasi-co-location relationship between synchronization signal blocks and/or third indication information indicating a cell-specific quasi-co-location relationship between synchronization signal blocks. Thereby, for some measurements (such as cell re-selection measurement and connected state RRM measurement) of unlicensed (or shared) frequency bands, a terminal equipment is able to correctly understand measurement information. Thereby, the flexibility of a network device configuration is improved, and the complexity and power consumption of terminal equipment measurement are further reduced.

Embodiments of a Second Aspect

The embodiments of the present disclosure provide a measurement method, which is further described based on the embodiments of the first aspect, the contents same as the embodiments of the first aspect are not repeated. The embodiments of the second aspect can be combined with the embodiments of the first aspect, or can be implemented separately.

In some embodiments, a terminal equipment receives configuration information transmitted by a network device, the configuration information including first indication information indicating one or more cell-specific synchronization signal blocks to be measured and third indication information indicating a cell-specific quasi-co-location relationship between synchronization signal blocks; wherein one or more bits of the first indication information is/are set according to the third indication information; and the terminal equipment performs measurements according to synchronization signal blocks to be measured as indicated by the first indication information.

In some embodiments, the first indication information is cell-specific synchronization signal block measurement information (ssb-ToMeasure), the third indication information is synchronization signal block quasi-co-location information (such as ssb-PositionQCL). One or more bits of the cell-specific synchronization signal block measurement information (ssb-ToMeasure) is/are set according to the synchronization signal block quasi-co-location information (such as ssb-PositionQCL).

For example, in a case where the cell-specific third indication information (such as ssb-PositionQCL) is configured, the cell-specific first indication information (cell specific ssb-ToMeasure) is configured. Namely, the cell-specific first indication information (cell specific ssb-ToMeasure) is added, this information and the cell-specific third indication information (ssb-PositionQCL) are configured together.

In some embodiments, in a case where the configuration information includes second indication information (such as ssb-PositionQCL-Common) indicating a frequency-specific quasi-co-location relationship between synchronization signal blocks, bits in the first indication information are also set according to the second indication information.

For example, for a specific cell, if cell-specific first indication information (cell specific ssb-ToMeasure) and cell-specific third indication information (ssb-PositionQCL) are configured, a SSB to be measured is determined according to these two cell-specific information; and if frequency-specific first indication information (frequency specific ssb-ToMeasure) and frequency-specific second indication information (ssb-PositionQCL-Common) are configured, a SSB to be measured is determined based on these two frequency-specific information.

In some embodiments, a terminal equipment receives configuration information transmitted by a network device, the configuration information including first indication information indicating one or more synchronization signal blocks to be measured; wherein values indicated by third indication information indicating a cell-specific quasi-co-location relationship between synchronization signal blocks, of multiple cells, are the same; one or more bits of the first indication information is/are set according to a value indicated by the third indication information; and the terminal equipment performs measurements according to synchronization signal blocks to be measured as indicated by the first indication information.

For example, for multiple cells, third indication information (such as ssb-PositionQCL) indicating a cell-specific quasi-co-location relationship between synchronization signal blocks all indicates a same value (e.g. 4), then one or more bits of the first indication information (such as ssb-ToMeasure) is/are set according to that same value (e.g. 4).

In some embodiments, in a case where the configuration information includes second indication information (ssb-PositionQCL-Common) indicating a frequency-specific quasi-co-location relationship between synchronization signal blocks but does not include third indication information (ssb-PositionQCL) indicating a cell-specific quasi-co-location relationship between synchronization signal blocks, bits in the first indication information are set according to the second indication information (ssb-PositionQCL-Common).

In some embodiments, the number of effective locations in the first indication information is a predetermined value, such as 8.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

Embodiments of a Third Aspect

The embodiments of the present disclosure provide a measurement method, which is described based on the embodiments of the first and second aspects, the contents same as the embodiments of the first aspect are not repeated. The embodiments of the third aspect are for idle state or inactive state measurement, can be combined with the embodiments of the first and second aspects, or can be implemented separately.

In some embodiments, a terminal equipment receives configuration information transmitted by a network device, wherein the configuration information includes first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks; and the terminal equipment performs measurement according to the synchronization signal blocks to be measured indicated by the first indication information.

In some embodiments, a network device may transmit configuration information for idle state or inactive state measurement via SIB4, SIB11 and RRCRelease.

In some embodiments, the first indication information is synchronization signal block measurement information (ssb-ToMeasure), the second indication information is synchronization signal block common quasi-co-location information (ssb-PositionQCL-Common), and the third indication information is synchronization signal block quasi-co-location information (ssb-PositionQCL), but the present disclosure is not limited to this.

For example, configuration information may include synchronization signal block measurement information (ssb-ToMeasure) and synchronization signal block common quasi-co-location information (ssb-PositionQCL-Common); or configuration information includes synchronization signal block measurement information (ssb-ToMeasure) and synchronization signal block quasi-co-location information (ssb-PositionQCL); or configuration information includes synchronization signal block measurement information (ssb-ToMeasure), synchronization signal block common quasi-co-location information (ssb-PositionQCL-Common) and synchronization signal block quasi-co-location information (ssb-PositionQCL).

In some embodiments, configuration information for an idle state or inactive state is, for example, carried in MeasIdConfig, MeasIdleCarrierNR or ssb-MeasConfig message, but the present disclosure is not limited to this. In a case where the configuration information is for an unlicensed frequency band, if the configuration information includes first indication information, the configuration information should include third indication information.

Further, a terminal equipment may determine a SSB to be measured at a corresponding frequency according to the embodiments of the first and second aspects.

In some embodiments, one or more bits of the synchronization signal block measurement information (ssb-ToMeasure) is/are set according to the synchronization signal block common quasi-co-location information (ssb-PositionQCL-Common).

In some embodiments, a K-th bit in the first indication information is set to be 0; where, K is greater than a value indicated by the second indication information. The number of synchronization signal blocks actually transmitted in a cell is not greater than the number of 1s in the first indication information.

In some embodiments, for a cell not providing the third indication information, the number of synchronization signal blocks that are actually transmitted is not greater than the number of is in the first indication information, and for a cell providing the third indication information, the number of synchronization signal blocks that are actually transmitted is not greater than a value indicated by the third indication information.

In some embodiments, for a cell not providing the third indication information, the number of synchronization signal blocks that are actually transmitted is not greater than a value indicated by the second indication information, and for a cell providing the third indication information, the number of synchronization signal blocks that are actually transmitted is not greater than a value indicated by the third indication information.

In some embodiments, for a cell providing the third indication information, the terminal equipment determines a mapping relationship between a synchronization signal block and a synchronization signal block index (SSB index) according to the third indication information of the cell, and determines synchronization signal blocks to be measured of the cell according to the determined mapping relationship and the first indication information;

for a cell not providing the third indication information, the terminal equipment determines a mapping relationship between a synchronization signal block and a synchronization signal block index (SSB index) according to the second indication information, and determines synchronization signal blocks to be measured of the cell according to the determined mapping relationship and the first indication information.

In some embodiments, for a cell providing the third indication information and a cell not providing the third indication information, the terminal equipment determines a first mapping relationship between a synchronization signal block and a synchronization signal block index (SSB index) according to the second indication information, and the terminal equipment determines synchronization signal blocks to be measured according to the first mapping relationship and the first indication information.

In some embodiments, for a cell providing the third indication information, the terminal equipment further determines a second mapping relationship between a synchronization signal block and a synchronization signal block index (SSB index) according to the third indication information of the cell, and measures the cell according to the second mapping relationship; for a cell not providing the third indication information, the terminal equipment further measures the cell according to the first mapping relationship.

In some embodiments, a terminal equipment ignores a K-th bit in the first indication information; wherein for a cell providing the third indication information, K is greater than a value indicated by the third indication information of the cell, for a cell not providing the third indication information, K is greater than a value indicated by the second indication information.

In some embodiments, one or more bits of the first indication information is/are set according to a maximum value indicated by the second indication information and the third indication information. For example, a K-th bit in the first indication information is set to be 0, wherein K is greater than a maximum value indicated by the first indication information and the second indication information.

The above disclosure describes a case where configuration information for idle/inactive measurements includes first indication information and second indication information and/or the third indication information. Thereby, the configuration information for idle/inactive measurements includes first indication information (such as ssb-ToMeasure) for indicating measurements, and also includes third indication information (such as ssb-PositionQCL) or second indication information (ssb-PositionQCL-Common) indicating a QCL relationship between SSBs. A terminal equipment can correctly understand measurement information (such as ssb-ToMeasure), thereby can perform some measurements (such as idle state and/or inactive state measurement) for unlicensed (or shared) frequency bands.

In some embodiments, a terminal equipment receives configuration information transmitted by a network device, wherein in a case where the configuration information is for an unlicensed frequency band, the configuration information does not include first indication information indicating one or more synchronization signal blocks to be measured. Further, the terminal equipment determines all synchronization signal blocks as synchronization signal blocks to be measured.

For example, for unlicensed frequency bands, MeasIdConfig, MeasIdleCarrierNR or ssb-MeasConfig does not include ssb-ToMeasure. Thereby, SSBs to be measured are all SSBs.

Thus, configuration information for idle/inactive measurements does not include first indication information (such as ssb-ToMeasure), a terminal equipment does not need to correctly understand the first indication information (such as ssb-ToMeasure) for measurement, default SSBs (such as all SSBs) are used, thereby can perform some measurements (such as idle state and/or inactive state measurement) for unlicensed (or shared) frequency bands.

In some embodiments, a terminal equipment receives configuration information transmitted by a network device, wherein the configuration information includes first indication information indicating one or more synchronization signal blocks to be measured; and the terminal equipment determines a mapping relationship between a synchronization signal block and a synchronization signal block index (SSB index) according to a predetermined value, and determines synchronization signal blocks to be measured according to the determined mapping relationship and the first indication information.

For example, the predetermined value is 8. It can be assumed that ssb-PositionQCL-Common=8 and/or ssb-PositionQCL=8, so as to determine SSB indexes and SSBs to be measured indicated by ssb-ToMeasure.

Thereby, the configuration information for idle/inactive measurements includes first indication information (such as ssb-ToMeasure), even if it does not include third indication information (such as ssb-PositionQCL) or second indication information (ssb-PositionQCL-Common) indicating a QCL relationship between SSBs. A terminal equipment can also correctly understand the first indication information (such as ssb-ToMeasure) for measurement according to a predetermined value, thereby can perform some measurements (such as idle state and/or inactive state measurement) for unlicensed (or shared) frequency bands.

In some embodiments, a terminal equipment may further transmit capability reporting information to the network device, the capability reporting information being used to report whether a terminal equipment supports performing idle state or inactive state measurement in an unlicensed frequency band.

For example, considering that idle/inactive measurement for unlicensed frequency bands may be supported in subsequent evolution, new UE capability reporting information may be introduced in a subsequent version. For example, the new UE capability reporting information is used for reporting whether to support idle/inactive measurements in an unlicensed frequency band. If yes, a base station may configure a UE to perform measurement in an unlicensed frequency band of a corresponding frequency range, SSBs to be measured are indicated and determined according to any one or more of the above embodiments, otherwise the base station does not configure the UE to perform idle/inactive measurements in an unlicensed frequency band.

Alternatively, a UE capability definition for whether to support idle/inactive measurements is still per FR. For a Rel-16 UE, even if the UE reports that idle/inactive measurements of FR1 are supported, a base station does not configure the UE to perform idle/inactive measurements in an unlicensed frequency band; for a UE in a subsequent version, if the UE reports that idle/inactive measurements of FR1 and/or FR2 are supported, a base station may configure the UE to perform measurements in an unlicensed frequency band of a corresponding frequency range, SSBs to be measured are indicated and determined according to any one or more of the above embodiments.

As can be known from the above embodiments, a terminal equipment can perform certain measurements (such as idle state or inactive state measurement) for unlicensed (or shared) frequency bands. Thereby, the flexibility of a network device configuration is improved, and the complexity and power consumption of terminal equipment measurement are further reduced.

Embodiments of a Fourth Aspect

The embodiments of the present disclosure disclose a BWP configuration method, can be combined with the embodiments of the first to third aspects, or can be implemented separately.

In some embodiments, a network device may configure BWP via UE-specific RRC signaling. For example, in a RRC-Reconfiguration message, for one or more cells, the BWP may be configured respectively. BWP configuration information includes an information field (such as subcarrierSpacing) for indicating a subcarrier spacing of the BWP. For initial DL BWP, a value of this information field should be the same as subCarrierSpacingCommon in MIB. However, for unlicensed frequency bands in FR1, this will limit network deployment or flexibility of the network deployment.

For example, for unlicensed frequency bands in FR1, subCarrierSpacingCommon in MIB is used to indicate a value of $$N_{SSB}^{QCL},$$

i.e., to indicate a QCL relationship between SSBs, as shown in the following table:

TABLE 4.1-1

Mapping between the combination of subCarrierSpacingCommon and LSB of ssb-SubcarrierOffset to $N_{SSB}^{QCL}$

| subCarrierSpacingCommon | LSB of ssb-SubcarrierOffset | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

For the FR1, from the perspective of indicating a SCS, if a value of subCarrierSpacingCommon is scs15 or 60, it indicates that the SCS is 15 kHz, and if the value of subCarrierSpacingCommon is scs30 or 120, it indicates that the SCS is 30 kHz. Thus, according to the above method, the following configuration combinations i.e., 3, 4, 5 and 6 cannot be indicated:

TABLE 9

| Combination of Configuration | SCS of initial BWP | $N_{SSB}^{QCL}$ |
|---|---|---|
| 1 | 15 kHz | 1 |
| 2 | 15 kHz | 2 |
| 3 | 15 kHz | 4 |
| 4 | 15 kHz | 8 |
| 5 | 30 kHz | 1 |
| 6 | 30 kHz | 2 |
| 7 | 30 kHz | 4 |
| 8 | 30 kHz | 8 |

Flexibility of the above configurations for unlicensed frequency bands may be increased in the following ways.

In some embodiments, for initial DL BWP of in unlicensed frequency band (for operation with shared spectrum channel access) (of e.g. FR1), a value of subcarrierSpacing is a value corresponding to a SCS of a SSB associated with the initial DL BWP. It can be expressed as "For the initial DL BWP this field has the value corresponding to the subcarrier spacing of the SSB associated to the initial DL BWP for operation with shared spectrum channel access".

In some embodiments, for initial DL BWP in unlicensed frequency band (for operation with shared spectrum channel access), a value of subcarrierSpacing is a value corresponding to a SCS of CORESET #0 configured for the initial DL BWP.

In some embodiments, for initial DL BWP in unlicensed frequency band (for operation with shared spectrum channel access), a value of subcarrierSpacing is a value corresponding to a SCS of a cell-defining SSB of the cell.

In some embodiments, for initial DL BWP in unlicensed frequency band (for operation with shared spectrum channel access), a value of subcarrierSpacing is a value corresponding to a SCS of a SSB of the cell.

For example, SCSes of SSBs transmitted in the same cell are the same.

In some embodiments, for initial DL BWP in unlicensed frequency band (for operation with shared spectrum channel access), a value of subcarrierSpacing is a value corresponding to a SCS of a SSB of the cell.

For example, SCSes of SSBs transmitted in the same cell are the same.

In some embodiments, a value of subcarrierSpacing is a value corresponding to Subcarrier spacing for SIB1, and/or, a value corresponding to Msg.2/4 for initial access, paging and broadcast SI-messages.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

Embodiments of a Fifth Aspect

The embodiments of the present disclosure provide a measurement apparatus. The apparatus may, for example, be a terminal equipment, or it may be one or more parts or components configured on the terminal equipment. The contents same as the embodiments of the first to third aspects are not repeated.

Figure 11:
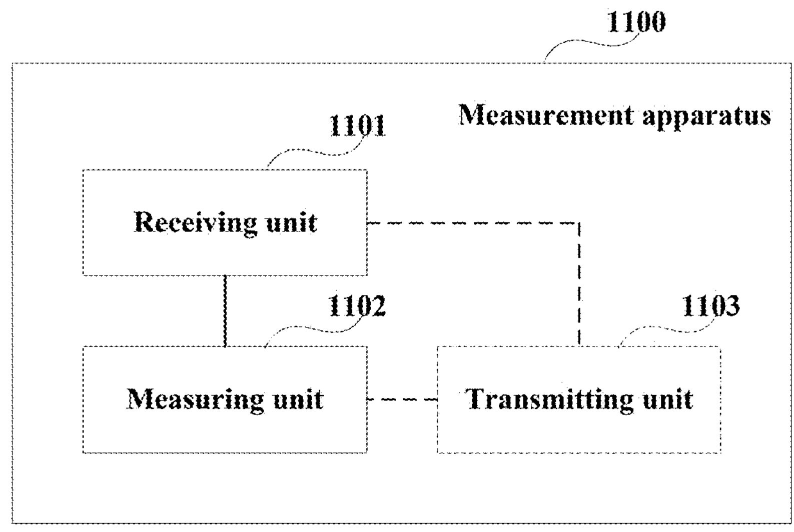
FIG. 11 is a schematic diagram of a measurement apparatus in the embodiments of the present disclosure.

FIG. 11 is a schematic diagram of a measurement apparatus in the embodiments of the present disclosure, as shown in FIG. 11, the apparatus 1100 includes: a receiving unit 1101, a measuring unit 1102 and a transmitting unit 1103.

In some embodiments, the receiving unit 1101 receives configuration information for cell reselection or measurement in connected state transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks; and the measuring unit 1102 performs measurement according to the synchronization signal blocks to be measured indicated by the first indication information.

In some embodiments, the first indication information is synchronization signal block measurement information, the second indication information is synchronization signal block common quasi-co-location information, and the third indication information is synchronization signal block quasi-co-location information.

In some embodiments, one or more bits in the synchronization signal block measurement information is/are set according to the synchronization signal block common quasi-co-location information.

In some embodiments, a K-th bit in the first indication information is set to be 0; where, K is greater than a value indicated by the second indication information.

In some embodiments, the number of synchronization signal blocks actually transmitted in a cell is not greater than the number of 1s in the first indication information.

In some embodiments, for a cell not providing the third indication information, the number of synchronization signal blocks that are actually transmitted is not greater than the number of is in the first indication information, for a cell providing the third indication information, the number of synchronization signal blocks that are actually transmitted is not greater than a value indicated by the third indication information.

In some embodiments, for a cell not providing the third indication information, the number of synchronization signal blocks that are actually transmitted is not greater than a value indicated by the second indication information, for a cell providing the third indication information, the number of synchronization signal blocks that are actually transmitted is not greater than a value indicated by the third indication information.

In some embodiments, the measuring unit 1102 is further configured to:

for a cell providing the third indication information, determine a mapping relationship between a synchronization signal block and a synchronization signal block index according to the third indication information of the cell, and determine synchronization signal blocks to be measured of the cell according to the determined mapping relationship and the first indication information;

for a cell not providing the third indication information, determine a mapping relationship between a synchronization signal block and a synchronization signal block index according to the second indication information, and determine synchronization signal blocks to be measured of the cell according to the determined mapping relationship and the first indication information.

In some embodiments, the measuring unit 1102 is further configured to:

for a cell providing the third indication information and a cell not providing the third indication information, determine a first mapping relationship between a synchronization signal block and a synchronization signal block index according to the second indication information, and determine a synchronization signal block to be measured according to the first mapping relationship and the first indication information.

In some embodiments, the measuring unit 1102 is further configured to:

for the cell providing the third indication information, determine a second mapping relationship between a synchronization signal block and a synchronization signal block index according to the third indication information of the cell, and measure the cell according to the second mapping relationship; for the cell not providing the third indication information, measure the cell according to the first mapping relationship.

In some embodiments, the measuring unit 1102 is further configured to:

ignore a K-th bit in the first indication information; wherein for a cell providing the third indication information, wherein K is greater than a value indicated by the third indication information of the cell, for a cell not providing the third indication information, K is greater than a value indicated by the second indication information.

In some embodiments, one or more bits of the first indication information is/are set according to a maximum value indicated by the second indication information and the third indication information.

In some embodiments, a K-th bit in the first indication information is set to be 0, wherein K is greater than a maximum value indicated by the first indication information and the second indication information.

In some embodiments, for cell reselection, the configuration information is carried in a system message, or, for measurement in connected state, the configuration information is carried in radio resource control information.

In some embodiments, the receiving unit 1101 receives configuration information for an idle state or inactive state transmitted by a network device, wherein the configuration information includes first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks; and the measuring unit 1102 performs measurement according to the synchronization signal blocks to be measured indicated by the first indication information.

In some embodiments, in a case where the configuration information is for an unlicensed frequency band, if the configuration information includes the first indication information, the configuration information (must) include(s) the third indication information.

In some embodiments, the first indication information is synchronization signal block measurement information, the second indication information is synchronization signal block common quasi-co-location information, and the third indication information is synchronization signal block quasi-co-location information.

In some embodiments, the receiving unit 1101 receives configuration information for an idle state or inactive state transmitted by a network device, wherein in a case where the configuration information is for an unlicensed frequency band, the configuration information does not include first indication information indicating one or more synchronization signal blocks to be measured. The measuring unit 1102 determines all synchronization signal blocks as synchronization signal blocks to be measured.

In some embodiments, the receiving unit 1101 receives configuration information for an idle state or inactive state transmitted by a network device, wherein the configuration information includes first indication information indicating one or more synchronization signal blocks to be measured; and the measuring unit 1102 determines a mapping relationship between a synchronization signal block and a synchronization signal block index (SSB index) according to a predetermined value, and determines synchronization signal blocks to be measured according to the determined mapping relationship and the first indication information.

In some embodiments, the transmitting unit 1103 transmits capability reporting information to the network device, the capability reporting information being used to report whether a terminal equipment supports performing idle state or inactive state measurement in an unlicensed frequency band.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

It's worth noting that the above only describes components or modules related to the present disclosure, but the present disclosure is not limited to this. The measurement apparatus 1100 may further include other components or modules. For detailed contents of these components or modules, relevant technologies can be referred to.

Moreover, for the sake of simplicity, FIG. 11 only demonstratively shows a connection relationship or signal direction between components or modules, however persons skilled in the art should know that various relevant technologies such as bus connection can be used. The above components or modules can be realized by a hardware facility such as a processor, a memory, a transmitter, a receiver, etc. The embodiments of the present disclosure have no limitation to this.

As can be known from the above embodiments, for certain measurements (such as cell reselection measurement and connected state RRM measurement) in unlicensed (or shared) frequency bands, a terminal equipment can correctly understand measurement information. In addition, the terminal equipment can perform certain measurements (such as idle state or inactive state measurement) for unlicensed (or shared) frequency bands. Thereby, the flexibility of a network device configuration is improved, and the complexity and power consumption of terminal equipment measurement are further reduced.

Embodiments of a Sixth Aspect

The embodiments of the present disclosure provide a measurement configuration apparatus. The apparatus may, for example, be a network device, or it may be one or more parts or components configured on the network device. The contents same as the embodiments of the first to fifth aspects are not repeated.

Figure 12:
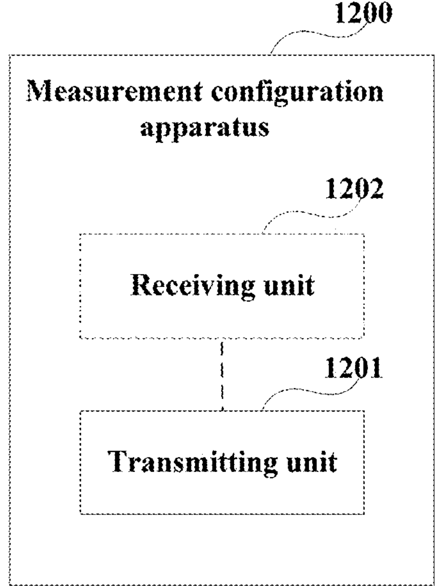
FIG. 12 is a schematic diagram of a measurement configuration apparatus in the embodiments of the present disclosure.

FIG. 12 is a schematic diagram of a measurement configuration apparatus in the embodiments of the present disclosure, as shown in FIG. 12, the measurement configuration apparatus 1200 includes: a transmitting unit 1201 and a receiving unit 1202.

In some embodiments, the transmitting unit 1201 transmits configuration information for cell reselection or measurement in connected state to a terminal equipment, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks.

In some embodiments, the transmitting unit 1201 transmits configuration information for an idle state or inactive state to a terminal equipment, the configuration information including first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks.

In some embodiments, the transmitting unit 1201 transmits configuration information for an idle state or inactive state to a terminal equipment, wherein in a case where the configuration information is for an unlicensed frequency band, the configuration information does not include first indication information indicating one or more synchronization signal blocks to be measured.

In some embodiments, the transmitting unit 1201 transmits configuration information for an idle state or inactive state to a terminal equipment, wherein the configuration information includes first indication information indicating one or more synchronization signal blocks to be measured; and the terminal equipment determines a mapping relationship between a synchronization signal block and a synchronization signal block index (SSB index) according to a predetermined value, and determines synchronization signal blocks to be measured according to the determined mapping relationship and the first indication information.

In some embodiments, the receiving unit 1202 receives capability reporting information transmitted by a terminal equipment, the capability reporting information being used to report whether the terminal equipment supports performing idle state or inactive state measurement in an unlicensed frequency band.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

It's worth noting that the above only describes components or modules related to the present disclosure, but the present disclosure is not limited to this. The measurement configuration apparatus 1200 may further include other components or modules. For detailed contents of these components or modules, relevant technologies can be referred to.

Moreover, for the sake of simplicity, FIG. 12 only demonstratively shows a connection relationship or signal direction between components or modules, however persons skilled in the art should know that various relevant technologies such as bus connection can be used. The above components or modules can be realized by a hardware facility such as a processor, a memory, a transmitter, a receiver, etc. The embodiments of the present disclosure have no limitation to this.

As can be known from the above embodiments, a network device performs measurement configuration for unlicensed (or shared) frequency bands, and a terminal equipment can correctly understand measurement information. In addition, the terminal equipment can perform measurements for unlicensed (or shared) frequency bands. Thereby, the flexibility of a network device configuration is improved, and the complexity and power consumption of terminal equipment measurement are further reduced.

Embodiments of a Seventh Aspect

The embodiments of the present disclosure further provide a communication system, FIG. 1 can be referred to, the contents same as the embodiments of the first to sixth aspects are not repeated.

In some embodiments, the communication system may include:

- a terminal equipment, configured to perform the measurement method described in the embodiments of the first to fourth aspects; and
- a network device, configured to perform the measurement configuration method described in the embodiments of the first to fourth aspects.

The embodiments of the present disclosure further provide a network device, for example may be a base station, but the present disclosure is not limited to this, it may also be other network device.

Figure 13:
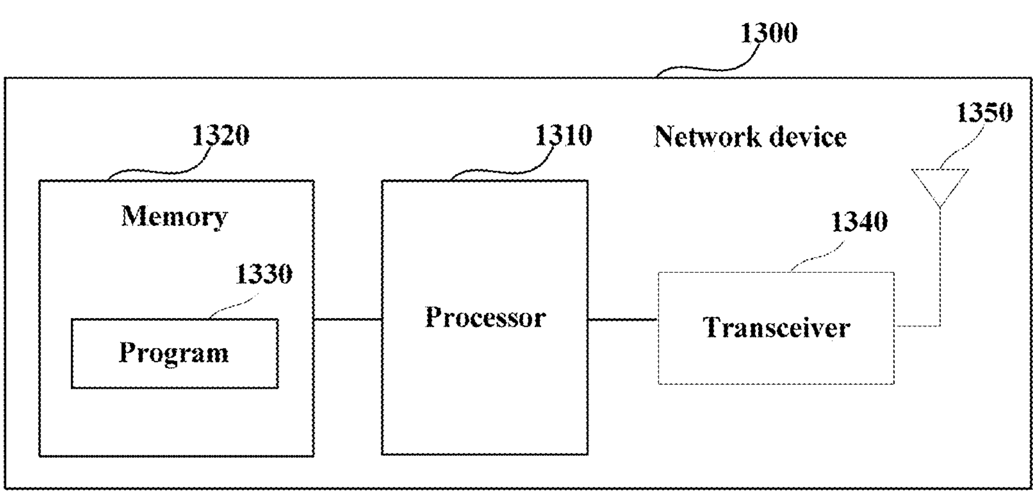
FIG. 13 is a schematic diagram of a network device in the embodiments of the present disclosure.

FIG. 13 is a composition schematic diagram of a network device in the embodiments of the present disclosure. As shown in FIG. 13, the network device 1300 may include: a processor 1310 (such as a central processing unit (CPU)) and a memory 1320; the memory 1320 is coupled to the processor 1310. The memory 1320 can store various data; moreover, also stores a program 1330 for information processing, and executes the program 1330 under the control of the processor 1310.

For example, the processor 1310 can be configured to execute a program to implement the measurement configuration method as described in the embodiments of the first to fourth aspects. For example, the processor 1310 may be configured to perform the following control: transmitting configuration information for cell reselection or measurement in connected state to a terminal equipment, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks.

In addition, as shown in FIG. 13, the network device 1300 may further include: a transceiver 1340 and an antenna 1350, etc.; wherein the functions of said components are similar to relevant arts, which are not repeated here. It's worth noting that the network device 1300 does not have to include all the components shown in FIG. 13. Moreover, the network device 1300 may also include components not shown in FIG. 13, relevant arts can be referred to.

The embodiments of the present disclosure further provide a terminal equipment, but the present disclosure is not limited to this, it may also be other device.

Figure 14:
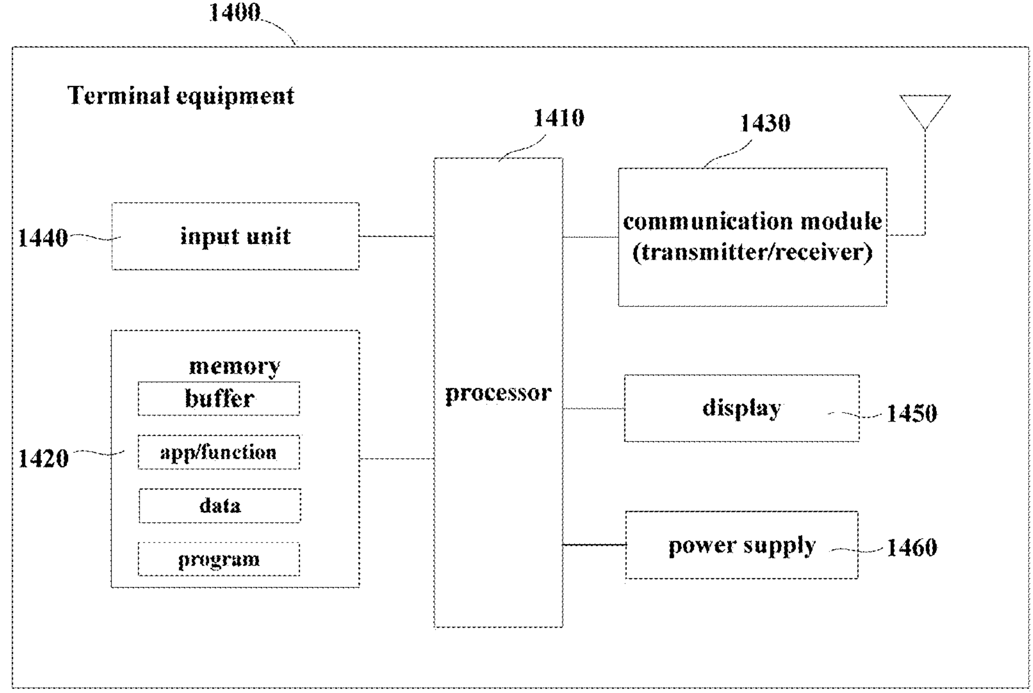
FIG. 14 is a schematic diagram of a terminal equipment in the embodiments of the present disclosure.

FIG. 14 is a schematic diagram of a terminal equipment in the embodiments of the present disclosure. As shown in FIG. 14, the terminal equipment 1400 may include a processor 1410 and a memory 1420; the memory 1420 stores data and programs, and is coupled to the processor 1410. It's worth noting that this figure is exemplary; other types of structures can also be used to supplement or replace this structure, so as to realize a telecommunication function or other functions.

For example, the processor 1410 can be configured to execute a program to implement the measurement method as described in the embodiments of the first to fourth aspects. For example, the processor 1410 may be configured to perform the following control: receiving configuration information for cell reselection or measurement in connected state transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks; and performing measurement according to the synchronization signal blocks to be measured indicated by the first indication information.

As shown in FIG. 14, the terminal equipment 1400 may further include: a communication module 1430, an input unit 1440, a display 1450 and a power source 1460. The functions of said components are similar to related arts, which are not repeated here. It's worth noting that the terminal equipment 1400 does not have to include all the components shown in FIG. 14, said components are not indispensable. Moreover, the terminal equipment 1400 may also include components not shown in FIG. 14, related arts can be referred to.

The embodiments of the present disclosure further provide a computer program, wherein when a terminal device executes the program, the program enables the terminal device to execute the measurement method described in the embodiments of the first to fourth aspects.

The embodiments of the present disclosure further provide a storage medium in which a computer program is stored, wherein the computer program enables a terminal device to execute the measurement method described in the embodiments of the first to fourth aspects.

The embodiments of the present disclosure further provide a computer program, wherein when a network device executes the program, the program enables the network device to execute the measurement configuration method described in the embodiments of the first to fourth aspects.

The embodiments of the present disclosure further provide a storage medium in which a computer program is stored, wherein the computer program enables a network device to execute the measurement configuration method described in the embodiments of the first to fourth aspects.

The apparatus and method in the present disclosure can be realized by hardware, or can be realized by combining hardware with software. The present disclosure relates to such a computer readable program, when the program is executed by a logic component, the computer readable program enables the logic component to realize the apparatus described in the above text or a constituent component, or enables the logic component to realize various methods or steps described in the above text. The present disclosure also relates to a storage medium storing the program, such as a hard disk, a magnetic disk, an optical disk, a DVD, a flash memory and the like.

By combining with the method/apparatus described in the embodiments of the present disclosure, it can be directly reflected as hardware, a software executed by a processor, or a combination of the two. For example, one or more in the functional block diagram or one or more combinations in the functional block diagram as shown in the figures may correspond to software modules of a computer program flow, and may also correspond to hardware modules. These software modules may respectively correspond to the steps as shown in the figures. These hardware modules can be realized by solidifying these software modules e.g. using a field-programmable gate array (FPGA).

A software module can be located in a RAM memory, a flash memory, a ROM memory, an EPROM memory, an EEPROM memory, a register, a hard disk, a mobile magnetic disk, a CD-ROM or a storage medium in any other form as known in this field. A storage medium can be coupled to a processor, thereby enabling the processor to read information from the storage medium, and to write the information into the storage medium; or the storage medium can be a constituent part of the processor. The processor and the storage medium can be located in an ASIC. The software module can be stored in a memory of a mobile terminal, and may also be stored in a memory card of the mobile terminal. For example, if a device (such as the mobile terminal) adopts a MEGA-SIM card with a larger capacity or a flash memory apparatus with a large capacity, the software module can be stored in the MEGA-SIM card or the flash memory apparatus with a large capacity.

One or more in the functional block diagram or one or more combinations in the functional block diagram as described in the figures can be implemented as a general-purpose processor for performing the functions described in the present disclosure, a digital signal processor (DSP), an application-specific integrated circuit (ASIC), a field-programmable gate array (FPGA) or other programmable logic device, discrete gate or transistor logic device, discrete hardware components or any combination thereof. One or more in the functional block diagram or one or more combinations in the functional block diagram as described in the figures can be also implemented as a combination of computer equipments, such as a combination of a DSP and a microprocessor, a plurality of microprocessors, one or more microprocessors combined and communicating with the DSP or any other such configuration.

The present disclosure is described by combining with the specific implementations, however persons skilled in the art should clearly know that these descriptions are exemplary and do not limit the protection scope of the present disclosure. Persons skilled in the art can make various variations and modifications to the present disclosure based on the spirit and principle of the present disclosure, these variations and modifications are also within the scope of the present disclosure.

As for the implementations including the above embodiments, the following supplements are also disclosed:

Supplement 1. A measurement method, including:

receiving, by a terminal equipment, configuration information for cell reselection or measurement in connected state transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks; and performing, by the terminal equipment, measurement according to the synchronization signal blocks to be measured indicated by the first indication information.

Supplement 2. The method according to Supplement 1, wherein the first indication information is synchronization signal block measurement information (ssb-ToMeasure), the second indication information is synchronization signal block common quasi-co-location information (ssb-PositionQCL-Common), and the third indication information is synchronization signal block quasi-co-location information (ssb-PositionQCL).

Supplement 3. The method according to Supplement 2, wherein one or more bits in the synchronization signal block measurement information (ssb-ToMeasure) is/are set according to the synchronization signal block common quasi-co-location information (ssb-PositionQCL-Common).

Supplement 4. The method according to any one of Supplements 1 to 3, wherein a K-th bit in the first indication information is set to be 0; where, K is greater than a value indicated by the second indication information.

Supplement 5. The method according to any one of Supplements 1 to 4, wherein the number of synchronization signal blocks actually transmitted in a cell is not greater than the number of is in the first indication information.

Supplement 6. The method according to any one of Supplements 1 to 5, wherein for a cell not providing the third indication information, the number of synchronization signal blocks that are actually transmitted is not greater than the number of is in the first indication information, for a cell providing the third indication information, the number of synchronization signal blocks that are actually transmitted is not greater than a value indicated by the third indication information.

Supplement 7. The method according to any one of Supplements 1 to 5, wherein for a cell not providing the third indication information, the number of synchronization signal blocks that are actually transmitted is not greater than a value indicated by the second indication information, for a cell providing the third indication information, the number of synchronization signal blocks that are actually transmitted is not greater than a value indicated by the third indication information.

Supplement 8. The method according to any one of Supplements 1 to 7, wherein the method further includes:

for a cell providing the third indication information, determining, by the terminal equipment, a mapping relationship between a synchronization signal block and a synchronization signal block index (SSB index) according to the third indication information of the cell, and determining synchronization signal blocks to be measured of the cell according to the determined mapping relationship and the first indication information;

for a cell not providing the third indication information, determining, by the terminal equipment, a mapping relationship between a synchronization signal block and a synchronization signal block index (SSB index) according to the second indication information, and determining synchronization signal blocks to be measured of the cell according to the determined mapping relationship and the first indication information.

Supplement 9. The method according to any one of Supplements 1 to 7, wherein the method further includes:

for a cell providing the third indication information and a cell not providing the third indication information, determining, by the terminal equipment, a first mapping relationship between a synchronization signal block and a synchronization signal block index (SSB index) according to the second indication information, and determining, by the terminal equipment, synchronization signal blocks to be measured according to the first mapping relationship and the first indication information.

Supplement 10. The method according to Supplement 9, wherein the method further includes:

for a cell providing the third indication information, further determining, by the terminal equipment, a second mapping relationship between a synchronization signal block and a synchronization signal block index (SSB index) according to the third indication information of the cell, and measuring the cell according to the second mapping relationship;

for a cell not providing the third indication information, further measuring, by the terminal equipment, the cell according to the first mapping relationship.

Supplement 11. The method according to any one of Supplements 1 to 10, wherein the method further includes:

ignoring, by the terminal equipment, a K-th bit of the first indication information;

wherein for a cell providing the third indication information, wherein K is greater than a value indicated by the third indication information of the cell, for a cell not providing the third indication information, K is greater than a value indicated by the second indication information.

Supplement 12. The method according to Supplement 1 or 2, wherein one or more bits of the first indication information is/are set according to a maximum value indicated by the second indication information and the third indication information.

Supplement 13. The method according to Supplement 12, wherein the K-th bit in the first indication information is set to be 0, wherein K is greater than a maximum value indicated by the first indication information and the second indication information.

Supplement 14. The method according to any one of Supplements 1 to 13, wherein for cell reselection, the configuration information is carried in a system message, or, for measurement in connected state, the configuration information is carried in radio resource control information.

Supplement 15. A measurement configuration method, including:

Transmitting, by a network device, configuration information for cell reselection or measurement in connected state to a terminal equipment, the configuration information includes first indication information indicating one or more synchronization signal blocks to be measured;

wherein one or more bits of the first indication information is/are set according to second indication information indicating a frequency-specific quasi-co-location relationship between synchronization signal blocks and/or third indication information indicating a cell-specific quasi-co-location relationship between synchronization signal blocks.

Supplement 16. A measurement method, including:

receiving, by a terminal equipment, configuration information for an idle state or inactive state transmitted by a network device, the configuration information including first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks; and performing, by the terminal equipment, measurement according to the synchronization signal blocks to be measured indicated by the first indication information.

Supplement 17. The method according to Supplement 16, wherein in a case where the configuration information is for an unlicensed frequency band, if the configuration information includes the first indication information, the configuration information should include the third indication information.

Supplement 18. The method according to Supplement 16 or 17, wherein the first indication information is synchronization signal block measurement information (ssb-ToMeasure), the second indication information is synchronization signal block common quasi-co-location information (ssb-PositionQCL-Common), and the third indication information is synchronization signal block quasi-co-location information (ssb-PositionQCL).

Supplement 19. The method according to Supplement 18, wherein one or more bits in the synchronization signal block measurement information (ssb-ToMeasure) is/are set according to the synchronization signal block common quasi-co-location information (ssb-PositionQCL-Common).

Supplement 20. The method according to any one of Supplements 16 to 19, wherein a K-th bit in the first indication information is set to be 0; where, K is greater than a value indicated by the second indication information.

Supplement 21. The method according to any one of Supplements 16 to 20, wherein the number of synchronization signal blocks actually transmitted in a cell is not greater than the number of 1s in the first indication information.

Supplement 22. The method according to any one of Supplements 16 to 21, wherein for a cell not providing the third indication information, the number of synchronization signal blocks that are actually transmitted is not greater than the number of 1s in the first indication information, for a cell providing the third indication information, the number of synchronization signal blocks that are actually transmitted is not greater than a value indicated by the third indication information.

Supplement 23. The method according to any one of Supplements 16 to 21, wherein for a cell not providing the third indication information, the number of synchronization signal blocks that are actually transmitted is not greater than a value indicated by the second indication information, for a cell providing the third indication information, the number of synchronization signal blocks that are actually transmitted is not greater than a value indicated by the third indication information.

Supplement 24. The method according to any one of Supplements 16 to 23, wherein the method further includes:

for a cell providing the third indication information, determining, by the terminal equipment, a mapping relationship between a synchronization signal block and a synchronization signal block index (SSB index) according to the third indication information of the cell, and determining synchronization signal blocks to be measured of the cell according to the determined mapping relationship and the first indication information;

for a cell not providing the third indication information, determining, by the terminal equipment, a mapping relationship between a synchronization signal block and a synchronization signal block index (SSB index) according to the second indication information, and determining synchronization signal blocks to be measured of the cell according to the determined mapping relationship and the first indication information.

Supplement 25. The method according to any one of Supplements 16 to 23, wherein the method further includes:

for a cell providing the third indication information and a cell not providing the third indication information, determining, by the terminal equipment, a first mapping relationship between a synchronization signal block and a synchronization signal block index (SSB index) according to the second indication information, and determining, by the terminal equipment, synchronization signal blocks to be measured according to the first mapping relationship and the first indication information.

Supplement 26. The method according to Supplement 25, wherein the method further includes:

for a cell providing the third indication information, further determining, by the terminal equipment, a second mapping relationship between a synchronization signal block and a synchronization signal block index (SSB index) according to the third indication information of the cell, and measuring the cell according to the second mapping relationship;

for a cell not providing the third indication information, further measuring, by the terminal equipment, the cell according to the first mapping relationship.

Supplement 27. The method according to any one of Supplements 16 to 26, wherein the method further includes:

ignoring, by the terminal equipment, a K-th bit in the first indication information;

wherein for a cell providing the third indication information, wherein K is greater than a value indicated by the third indication information of the cell, for a cell not providing the third indication information, K is greater than a value indicated by the second indication information.

Supplement 28. The method according to Supplement 16 or 17, wherein one or more bits of the first indication information is/are set according to a maximum value indicated by the second indication information and the third indication information.

Supplement 29. The method according to Supplement 28, wherein the K-th bit in the first indication information is set to be 0, wherein K is greater than a maximum value indicated by the first indication information and the second indication information.

Supplement 30. The method according to any one of Supplements 16 to 29, wherein for cell reselection, the configuration information is carried in a system message, or, for measurement in connected state, the configuration information is carried in radio resource control information.

Supplement 31. A measurement configuration method, including:

Transmitting, by a network device, configuration information for an idle state or an inactive state to a terminal equipment;

wherein the configuration information including first indication information indicating one or more synchronization signal blocks to be measured, and second indication information indicating a frequency-specific quasi-co-location relationship between synchronization signal blocks and/or third indication information indicating a cell-specific quasi-co-location relationship between synchronization signal blocks.

Supplement 32. A measurement method, including:

receiving, by a terminal equipment, configuration information for an idle state or inactive state transmitted by a network device, wherein in a case where the configuration information is for an unlicensed frequency band, the configuration information does not include first indication information indicating one or more synchronization signal blocks to be measured.

Supplement 33. The method according to Supplement 32, wherein the method further includes:

determining, by the terminal equipment, all synchronization signal blocks as synchronization signal blocks to be measured.

Supplement 34. The method according to Supplement 32, wherein the first indication information is synchronization signal block measurement information (ssb-ToMeasure).

Supplement 35. A measurement configuration method, including:

transmitting, by a network device, configuration information for an idle state or an inactive state to a terminal equipment;

wherein in a case where the configuration information is for an unlicensed frequency band, the configuration information does not include first indication information indicating one or more synchronization signal blocks to be measured.

Supplement 36. A measurement method, including:

receiving, by a terminal equipment, configuration information for an idle state or inactive state transmitted by a network device, wherein the configuration information includes first indication information indicating one or more synchronization signal blocks to be measured; and determining, by the terminal equipment, a mapping relationship between a synchronization signal block and a synchronization signal block index (SSB index) according to a predetermined value, and determining synchronization signal blocks to be measured according to the determined mapping relationship and the first indication information.

Supplement 37. The method according to Supplement 36, wherein the first indication information is synchronization signal block measurement information (ssb-ToMeasure).

Supplement 38. A measurement configuration method, including:

transmitting, by a network device, configuration information for an idle state or inactive state to a terminal equipment, wherein the configuration information includes first indication information indicating one or more synchronization signal blocks to be measured; and determining, by the terminal equipment, a mapping relationship between a synchronization signal block and a synchronization signal block index (SSB index) according to a predetermined value, and determining synchronization signal blocks to be measured according to the determined mapping relationship and the first indication information.

Supplement 39. The method according to any one of Supplements 31 to 38, wherein the method further includes:

transmitting, by the terminal equipment, capability reporting information to the network device, the capability reporting information being used to report whether the terminal equipment supports performing idle state or inactive state measurement in an unlicensed frequency band.

Supplement 40. A measurement method, including:

receiving, by a terminal equipment, configuration information for cell reselection or measurement in connected state transmitted by a network device, the configuration information including first indication information indicating one or more synchronization signal blocks to be measured; wherein one or more bits of the first indication information is/are set according to second indication information indicating a frequency-specific quasi-co-location relationship between synchronization signal blocks; and performing, by the terminal equipment, measurement according to the synchronization signal blocks to be measured indicated by the first indication information.

Supplement 41. A measurement method, including:

receiving, by a terminal equipment, configuration information for cell reselection or measurement in connected state transmitted by a network device, the configuration information including first indication information indicating one or more synchronization signal blocks to be measured; wherein one or more bits of the first indication information is/are set according to a maximum value in second indication information indicating a frequency-specific quasi-co-location relationship between synchronization signal blocks and third indication information indicating a cell-specific quasi-co-location relationship between synchronization signal blocks; and performing, by the terminal equipment, measurement according to the synchronization signal blocks to be measured indicated by the first indication information.

Supplement 42. A measurement method, including:

receiving, by a terminal equipment, configuration information for cell reselection or measurement in connected state transmitted by a network device, the configuration information including cell-specific first indication information indicating one or more synchronization signal blocks to be measured, and third indication information indicating a cell-specific quasi-co-location relationship between synchronization signal blocks; and performing, by the terminal equipment, measurement according to the synchronization signal blocks to be measured indicated by the first indication information.

Supplement 43. A measurement method, including:

receiving, by a terminal equipment, configuration information for cell reselection or measurement in connected state transmitted by a network device, the configuration information including first indication information indicating one or more synchronization signal blocks to be measured; wherein one or more bits of the first indication information is/are set according to a same value indicated by third indication information indicating a cell-specific quasi-co-location relationship between synchronization signal blocks; and performing, by the terminal equipment, measurement according to the synchronization signal blocks to be measured indicated by the first indication information.

Supplement 44. A measurement method, including:

receiving, by a terminal equipment, configuration information for cell reselection or measurement in connected state transmitted by a network device, the configuration information including first indication information indicating one or more synchronization signal blocks to be measured; wherein one or more bits of the first indication information is/are set according to a predetermined value; and performing, by the terminal equipment, measurement according to the synchronization signal blocks to be measured indicated by the first indication information.

Supplement 45. A measurement configuration method, including:

configuring, by a network device, BWP via UE-specific RRC signaling;

wherein for initial downlink BWP in an unlicensed frequency band, a value of a subcarrier spacing is a value corresponding to a SCS of a SSB associated with the initial downlink BWP, and/or for initial downlink BWP in an unlicensed frequency band, a value of a subcarrier spacing is a value corresponding to a SCS of CORESET #0 configured for the initial downlink BWP, and/or for initial downlink BWP of in unlicensed frequency band, a value of a subcarrier spacing is a value corresponding to a SCS of a cell-defined SSB of a cell, and/or for initial downlink BWP of in unlicensed frequency band, a value of a subcarrier spacing is a value corresponding to a SCS of a SSB of a cell, and/or for initial downlink BWP of in unlicensed frequency band, a value of a subcarrier spacing is a value corresponding to a SCS of a SSB of a cell, and/or for initial downlink BWP of in unlicensed frequency band, a value of subcarrier Spacing is a value corresponding to Subcarrier spacing for SIB1, and/or, a value corresponding to Msg.2/4 for initial access, paging and broadcast SI-messages.

Supplement 46. A terminal equipment, including a memory and a processor, the memory storing a computer program, and the processor being configured to execute the measurement method according to any one of Supplements 1 to 14, 16-30, 32-34, 36-37 and 39-44.

Supplement 47. A network device, including a memory and a processor, the memory storing a computer program, and the processor being configured to execute the measurement configuration method according to any one of Supplements 15, 31, 35, 38 and 45.

Supplement 48. A communication system, including the terminal equipment according to Supplement 46 and the network device according to Supplement 47.

What is claimed is:

1. A measurement apparatus, comprising:

a receiver configured to receive configuration information for cell reselection or measurement in connected state transmitted by a network device, the configuration information comprising first indication information indicating one or more synchronization signal blocks to be measured;

wherein one or more bits of the first indication information is/are set according to second indication information indicating a frequency-specific quasi-co-location relationship between synchronization signal blocks, the frequency-specific quasi-co-location relationship between synchronization signal blocks indicated by the second indication information applying to a cell without corresponding third indication information which indicates a cell-specific quasi-co-location relationship; and processor circuitry configured to perform measurement according to the synchronization signal blocks to be measured indicated by the first indication information.

2. The apparatus according to claim 1, wherein the first indication information is synchronization signal block measurement information, the second indication information is synchronization signal block common quasi-co-location information.

3. The apparatus according to claim 2, wherein one or more bits in the synchronization signal block measurement information is/are set according to the synchronization signal block common quasi-co-location information.

4. The apparatus according to claim 1, wherein a K-th bit in the first indication information is set to be 0; where, K is greater than a value indicated by the second indication information, the K-th bit refers to the bit at position K in the first indication information, where the leftmost bit is position 1 and subsequent bits are numbered consecutively to the right.

5. The apparatus according to claim 1, wherein the number of synchronization signal blocks actually transmitted in a cell is not greater than the number of bits of which value is '1' in the first indication information.

6. The apparatus according to claim 1, wherein the second indication information is mandatory present in the configuration information for shared spectrum.

7. The apparatus according to claim 1, wherein for a cell not providing third indication information, the number of synchronization signal blocks that are actually transmitted is not greater than the number of bits of which value is '1' in the first indication information, for a cell providing the third indication information, the number of synchronization signal blocks that are actually transmitted is not greater than a value indicated by the third indication information.

8. The apparatus according to claim 1, wherein for a cell not providing third indication information, the number of synchronization signal blocks that are actually transmitted is not greater than a value indicated by the second indication information, for a cell providing the third indication information, the number of synchronization signal blocks that are actually transmitted is not greater than a value indicated by the third indication information.

9. The apparatus according to claim 1, wherein the processor circuitry is further configured to:

for a cell providing third indication information, determine a mapping relationship between a synchronization signal block and a synchronization signal block index according to the third indication information of the cell, and determine synchronization signal blocks to be measured of the cell according to the determined mapping relationship and the first indication information;

for a cell not providing the third indication information, determine a mapping relationship between a synchronization signal block and a synchronization signal block index according to the second indication information, and determine synchronization signal blocks to be measured of the cell according to the determined mapping relationship and the first indication information.

10. The apparatus according to claim 1, wherein the processor circuitry is further configured to:

for a cell providing the third indication information and a cell not providing the third indication information, determine a first mapping relationship between a synchronization signal block and a synchronization signal block index according to the second indication information, and determine a synchronization signal block to be measured according to the first mapping relationship and the first indication information.

11. The apparatus according to claim 1, wherein the processor circuitry is further configured to: ignore a K-th bit in the first indication information; wherein for a cell providing third indication information, K is greater than a value indicated by the third indication information of the cell, and for a cell not providing the third indication information, K is greater than a value indicated by the second indication information, the K-th bit refers to the bit at position K in the first indication information, where the leftmost bit is position 1 and subsequent bits are numbered consecutively to the right.

12. The apparatus according to claim 1, wherein one or more bits of the first indication information is/are set according to a maximum value indicated by the second indication information and third indication information.

13. The apparatus according to claim 12, wherein a K-th bit in the first indication information is set to be 0, wherein K is greater than a maximum value indicated by the third indication information and the second indication information, the K-th bit refers to the bit at position K in the first indication information, where the leftmost bit is position 1 and subsequent bits are numbered consecutively to the right.

14. The apparatus according to claim 1, wherein for cell reselection, the configuration information is carried in a system message, or, for measurement in connected state, the configuration information is carried in radio resource control information.

15. A network device comprising:

a memory; and processor circuitry coupled to the memory and configured to:

transmit configuration information for cell reselection or measurement in connected state transmitted to a measurement device, the configuration information comprising first indication information indicating one or more synchronization signal blocks to be measured;

wherein one or more bits of the first indication information is/are set according to second indication information indicating a frequency-specific quasi-co-location relationship between synchronization signal blocks, the frequency-specific quasi-co-location relationship between synchronization signal blocks indicated by the second indication information applying to a cell without corresponding third indication information which indicates a cell-specific quasi-co-location relationship.

* * * * *